US009503324B2

(12) United States Patent
Smith et al.

(10) Patent No.: US 9,503,324 B2
(45) **Date of Patent: *Nov. 22, 2016**

(54) SYSTEMS AND METHODS FOR ENTERPRISE MISSION MANAGEMENT OF A COMPUTER NETWORK

(71) Applicant: HARRIS CORPORATION, Melbourne, FL (US)

(72) Inventors: Wayne B. Smith, Melbourne Beach, FL (US); Margaret Knepper, Melbourne, FL (US); Ashley M. Kopman, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/072,361

(22) Filed: Nov. 5, 2013

(65) Prior Publication Data

US 2015/0127790 A1 May 7, 2015

(51) Int. Cl.

| | |
|---|---|
| ***G06F 15/177*** | (2006.01) |
| ***H04L 12/24*** | (2006.01) |
| ***H04L 29/06*** | (2006.01) |

(52) U.S. Cl.

CPC ....... *H04L 41/0816* (2013.01); *H04L 41/0873* (2013.01); *H04L 63/1416* (2013.01)

(58) Field of Classification Search

CPC ............. H04L 41/0813–41/082; H04L 12/24; H04L 41/0816; H04L 63/1416; H04L 41/0873

USPC ....... 709/221, 223, 224, 229, 232, 225, 245; 706/55; 726/1, 26; 705/7.36

See application file for complete search history.

(56) References Cited

U.S. PATENT DOCUMENTS

| | | | |
|---|---|---|---|
| 5,671,412 | A * | 9/1997 | Christiano |
| 5,734,649 | A | 3/1998 | Carvey et al. |

(Continued)

FOREIGN PATENT DOCUMENTS

| | | |
|---|---|---|
| CN | 1173256 | 2/1998 |
| JP | 2008177714 A | 7/2008 |
| WO | 97/13340 | 4/1997 |

OTHER PUBLICATIONS

John Michalski, Carrie Price, Eric stanton, EriK Lee, Chua, Kuan Seah, Wong, Yip Heng and Tan, Chung Pheng. SAND report: Final Report for the Network Security Mechanisms Utilizing Network Address Translation LDRD Project, Sandia National Laboratories, 2002, p. 1-84.*

(Continued)

*Primary Examiner* — David Lazaro
*Assistant Examiner* — Berhanu Shitayewoldetsadi
(74) *Attorney, Agent, or Firm* — Fox Rothschild LLP; Robert J. Sacco; Carol E. Thorstad-Forsyth

(57) ABSTRACT

Systems (100) and methods (1400) for enterprise mission management of a Computer Network ("CN"). The methods involve configuring CN to operate in accordance with a first Mission Plan ("MP") specifying a manner in which an assigned value for a first IDentity Parameter ("IDP") is to be dynamically modified by a first node of CN; detecting a trigger event which indicates that a new MP needs to be implemented within CN; obtaining a second MP that specifies a manner in which an assigned value for a second IDP is to be dynamically modified by a second node of CN; determining if any conflicts exist between operations of the second node defined by the second MP and operations of the first node defined by the first MP; and configuring operations of CN to further operate in accordance with the second MP if it is determined that no conflict exists.

22 Claims, 22 Drawing Sheets

(56) References Cited

U.S. PATENT DOCUMENTS

| | | | |
|---|---|---|---|
| 6,052,064 | A | 4/2000 | Budnik et al. |
| 6,055,236 | A | 4/2000 | Nessett et al. |
| 6,122,572 | A * | 9/2000 | Yavnai ................. G05D 1/0088 342/13 |
| 6,154,839 | A | 11/2000 | Arrow et al. |
| 6,510,154 | B1 | 1/2003 | Mayes et al. |
| 6,535,511 | B1 | 3/2003 | Rao |
| 6,618,761 | B2 | 9/2003 | Munger et al. |
| 6,646,989 | B1 | 11/2003 | Khotimsky et al. |
| 6,826,684 | B1 | 11/2004 | Fink et al. |
| 6,917,974 | B1 | 7/2005 | Stytz et al. |
| 6,978,300 | B1 * | 12/2005 | Beukema et al. ............ 709/223 |
| 6,981,146 | B1 | 12/2005 | Sheymov |
| 7,007,080 | B2 * | 2/2006 | Wilson .......................... 709/221 |
| 7,010,604 | B1 | 3/2006 | Munger et al. |
| 7,043,633 | B1 | 5/2006 | Fink et al. |
| 7,085,267 | B2 | 8/2006 | Carey et al. |
| 7,089,303 | B2 | 8/2006 | Sheymov et al. |
| 7,133,930 | B2 | 11/2006 | Munger et al. |
| 7,185,075 | B1 * | 2/2007 | Mishra et al. ................ 709/223 |
| 7,216,359 | B2 | 5/2007 | Katz et al. |
| 7,236,598 | B2 | 6/2007 | Sheymov et al. |
| 7,382,778 | B2 | 6/2008 | Chari et al. |
| 7,469,279 | B1 | 12/2008 | Stamler et al. |
| 7,712,130 | B2 | 5/2010 | Reamer |
| 7,739,497 | B1 | 6/2010 | Fink et al. |
| 7,756,140 | B2 | 7/2010 | Matoba |
| 7,757,272 | B1 | 7/2010 | Dean |
| 7,787,476 | B2 | 8/2010 | Shimizu et al. |
| 7,895,348 | B2 | 2/2011 | Twitchell, Jr. |
| 7,937,489 | B2 | 5/2011 | Shizuno |
| 7,958,556 | B2 | 6/2011 | Roesch et al. |
| 7,996,894 | B1 | 8/2011 | Chen et al. |
| 8,037,530 | B1 | 10/2011 | Fink et al. |
| 8,139,504 | B2 | 3/2012 | Mankins et al. |
| 8,199,677 | B1 | 6/2012 | Amis et al. |
| 8,429,393 | B1 * | 4/2013 | Anderson ............... G06F 21/73 380/273 |
| 8,464,334 | B1 | 6/2013 | Singhal |
| 8,522,341 | B2 | 8/2013 | Nochta et al. |
| 8,572,717 | B2 | 10/2013 | Narayanaswamy |
| 8,769,688 | B2 | 7/2014 | Geigel |
| 8,844,036 | B2 | 9/2014 | Saidi et al. |
| 8,862,747 | B2 | 10/2014 | Shah et al. |
| 8,959,573 | B2 | 2/2015 | Smith et al. |
| 2001/0021952 | A1 * | 9/2001 | Hirasawa ...................... 709/310 |
| 2002/0003804 | A1 * | 1/2002 | Hjalmtysson et al. ....... 370/410 |
| 2002/0010799 | A1 | 1/2002 | Kubota et al. |
| 2002/0055353 | A1 * | 5/2002 | Rousseau et al. ............ 455/414 |
| 2002/0161884 | A1 | 10/2002 | Munger et al. |
| 2002/0161905 | A1 | 10/2002 | Haverinen et al. |
| 2003/0051026 | A1 * | 3/2003 | Carter et al. .................. 709/224 |
| 2003/0097445 | A1 * | 5/2003 | Todd et al. ................... 709/226 |
| 2003/0149783 | A1 | 8/2003 | McDaniel |
| 2004/0022194 | A1 | 2/2004 | Ricciulli |
| 2004/0103205 | A1 | 5/2004 | Larson et al. |
| 2004/0198392 | A1 * | 10/2004 | Harvey et al. ............. 455/456.1 |
| 2004/0252837 | A1 * | 12/2004 | Harvey et al. ................ 380/270 |
| 2004/0255167 | A1 | 12/2004 | Knight |
| 2005/0038708 | A1 | 2/2005 | Wu |
| 2005/0172155 | A1 | 8/2005 | Sheymov |
| 2005/0235044 | A1 | 10/2005 | Tazuma |
| 2006/0121418 | A1 | 6/2006 | DeMarco et al. |
| 2006/0230126 | A1 * | 10/2006 | Bhogal ................. H04L 67/125 709/220 |
| 2007/0058540 | A1 | 3/2007 | Kay |
| 2007/0073838 | A1 | 3/2007 | Shizuno |
| 2007/0081473 | A1 * | 4/2007 | Jiang ............................. 370/254 |
| 2007/0081541 | A1 | 4/2007 | Umekage et al. |
| 2007/0133576 | A1 | 6/2007 | Tsuge et al. |
| 2007/0256078 | A1 * | 11/2007 | Falk et al. .................... 718/104 |
| 2007/0261112 | A1 | 11/2007 | Todd et al. |
| 2008/0052487 | A1 | 2/2008 | Akahane et al. |
| 2008/0056487 | A1 | 3/2008 | Akyol et al. |
| 2008/0140847 | A1 | 6/2008 | Almog |
| 2008/0159128 | A1 | 7/2008 | Shaffer et al. |
| 2008/0172739 | A1 | 7/2008 | Nakae et al. |
| 2008/0205399 | A1 | 8/2008 | Delesalle et al. |
| 2008/0222734 | A1 | 9/2008 | Redlich et al. |
| 2008/0235755 | A1 * | 9/2008 | Blaisdell et al. ................. 726/1 |
| 2008/0313348 | A1 | 12/2008 | Morris et al. |
| 2009/0031042 | A1 | 1/2009 | Phatak |
| 2009/0059788 | A1 | 3/2009 | Granovsky et al. |
| 2009/0103726 | A1 * | 4/2009 | Ahmed ................. H04L 9/0668 380/46 |
| 2009/0106439 | A1 | 4/2009 | Twitchell, Jr. |
| 2009/0165116 | A1 | 6/2009 | Morris |
| 2009/0265299 | A1 | 10/2009 | Hadad et al. |
| 2009/0285101 | A1 | 11/2009 | Lu |
| 2010/0009758 | A1 | 1/2010 | Twitchell, Jr. |
| 2010/0229241 | A1 | 9/2010 | Liu et al. |
| 2010/0246823 | A1 | 9/2010 | Xiao et al. |
| 2010/0274923 | A1 | 10/2010 | Dean |
| 2010/0322391 | A1 * | 12/2010 | Michaelis ......... H04M 3/42391 379/45 |
| 2010/0333188 | A1 | 12/2010 | Politowicz |
| 2011/0016210 | A1 | 1/2011 | Underwood |
| 2011/0103394 | A1 * | 5/2011 | Vogt .................. H04L 29/12367 370/401 |
| 2011/0179136 | A1 | 7/2011 | Twitchell, Jr. |
| 2011/0277032 | A1 | 11/2011 | Vargas |
| 2012/0117376 | A1 | 5/2012 | Fink et al. |
| 2012/0201138 | A1 | 8/2012 | Yu et al. |
| 2012/0303616 | A1 | 11/2012 | Abuelsaad et al. |
| 2013/0104228 | A1 | 4/2013 | Burnham et al. |
| 2013/0298221 | A1 | 11/2013 | Smith et al. |
| 2013/0298227 | A1 | 11/2013 | Smith et al. |
| 2013/0298236 | A1 | 11/2013 | Smith et al. |

OTHER PUBLICATIONS

Zhao, C., Jia, C., & Lin, K. (Oct. 2010). Technique and Application of End-Hopping in Network Defense. In Cryptography and Network Security, Data Mining and Knowledge Discovery, E-Commerce & Its Applications and Embedded Systems (CDEE), 2010 First ACIS International Symposium on (pp. 266-270). IEEE.

Repik, K.A. "Defeating Adversary Network Intelligence Efforts With Active Cyber Defense Techniques", Degree of Master of Cyber Warfare, Jun. 1, 2008, XP55004366, Retrieved from the Internet: URL:<http://www,dtic.mil/cgi-bin/GetTRDoc?A> D=ADA488411&Location=U2Adoc=GetTRDoc.pdf [retrieved on Aug. 9, 2011].

Shi, L., et al., "Full Service Hopping for Proactive Cyber-Defense", International Conference on Networking, Sensing and Control, 2008. ICNSC 2008, IEEE, Apr. 6-8, 2008.

Kewley, D., et al., "Dynamic Approach to Thwart Adversary Intelligence Gathering," pp. 176-185, 0-7695-1212-7/01 2001 IEEE.

Beraud, P., et al., "Cyber Defense Network Maneuver Commander", 978-1-4244-7402-8/10 2010 IEEE.

Levin, D., "Lessons Learned in Using Live Red Teams in IA Experiments", Retrieved from the Internet <URL:http://www.bbn.com/resources/pdf/RedTeamExptsPaper-Levin10-02.pdf>>, [retrieved on Apr. 9, 2012].

Information about Related Patents and Patent Applications, see section 6 of the accompanying Information Disclosure Statement Letter, which concerns Related Patents and Patent Applications. Nov. 5, 2013.

Michalski, John., et al., "Final Report for the Network Security Mechanisms Utilizing Network Address Translation LDRD Project (SAND2002-3613)" (Nov. 2002) Retrieved from the Internet: URL:http://prod.sandia.gov/techlib/access-control.cgi/2002/023613.pdf [retrieved on Apr. 19, 2013].

Atighetchi, M., et al, "Adaptive Use of Network-Centric Mechanism in Cyber-Defense", Proc. 6th IEEE International Symp. Object-Oriented Real-Time Distributed Computing, IEEE CS Press, 2003, p. 183-192.

International Search Report mailed Apr. 29, 2013, Application Serial No. PCT/US2013/023702 in the name of Harris Corporation.

(56) References Cited

OTHER PUBLICATIONS

Information about Related Patents and Patent Applications, see section 6 of the accompanying Information Disclosure Statement Letter, which concerns Related Patents and Patent Applications.
Masking Networks, Inc. "MS-200 Network Masking Capabilities", Jun. 2010.
Zhao, C., Jia, C., & Lin, K, (Oct. 2010). Technique and Application of End-Hopping in Network Defense. In Cryptography and Network Security, Data Mining and Knowledge Discovery, E-Commerce & Its Applications and Embedded Systems (CDEE), 2010 First ACIS International Symposium on (pp. 266-270). IEEE.
Repik, K.A. "Defeating Adversary Network Intelligence Efforts With Active Cyber Defense Techniques", Degree of Master of Cyber Warfare, Jun. 1, 2008, XP55004366, Retrieved from the Internet: URL:<http://www.dtic.mil/cgi-bin/GetTRDoc?A> D=ADA488411&Location=U2&doc=GetTRDoc.pdf [retrieved on Aug. 9, 2011].
International Search Report mailed Mar. 3, 2014, Application Serial No. PCT/SUS2013/038557 in the name of Harris Corporation.
International Preliminary Report on the Patentability mailed Nov. 13, 2014, Application Serial No. PCT/US2013/037883 in the name of Harris Corporation.
International Preliminary Report on the Patentability mailed Nov. 13, 2014 Application Serial No. PCT/US2013/037888 in the name of Harris Corporation.
International Preliminary Report on the Patentability mailed Nov. 13, 2014 Application Serial No. PCT/US2013/037894 in the name of Harris Corporation.
International Preliminary Report on the Patentability mailed Nov. 13, 2014 Application Serial No. PCT/US2013/037976 in the name of Harris Corporation.
International Preliminary Report on the Patentability mailed Nov. 13, 2014 Application Serial No. PCT/US2013/038557 in the name of Harris Corporation.
International Preliminary Report on the Patentability mailed Nov. 13, 2014 Application Serial No. PCT/US2013/038558 in the name of Harris Corporation.
Jian, Y. et al., "A Novel Scheme for Protecting Receiver's Location Privacy in Wireless Sensor Networks," IEEE Transactions on Wireless Communications, vol. 7, No. 10, Oct. 2008, pp. 3769-3779.
International Preliminary Report on the Patentability mailed Nov. 13, 2014 Application Serial No. PCT/US2013/038600 in the name of Harris Corporation.
Ganeriwal et al., Secure time synchronization service for sensor networks, 2010, ACM Digital Library, pp. 97-106.
Rajasegarar et al., Anomaly detection in wireless sensor networks, 2008, IEEE, vol. 15, Issue 4, pp. 34-40.
Search Report for Taiwan Patent Application No. 102115550 dated Oct. 20, 2014.
Boukerche et al., "Secure time synchronization protocols for wireless sensor networks," Wireless Communications, IEEE, 2007, vol. 14.5, pp. 64-69.
Wu et al., "CAR: Securing PCM Main Memory System with Cache Address Remapping," Parallel and Distributed Systems (ICPADS), 2012 IEEE 18th International Conference, Dec. 2012, pp. 628-635.

* cited by examiner

| Identity Parameter | Description | Technique |
| --- | --- | --- |
| IP Address | 32 bit number, Class C 254 Addresses | IP Header Manipulation Packet Data Manipulation |
| MAC Address | 6 Bytes - 281,474,976,710,656 Addresses First 3 Bytes - (OUI), Last 3 Bytes – NIC Specific | Ethernet Header Manipulation |
| Net/Subnet | Class A, B, or C Addresses | Cross Stream Fragmentation |
| TCP Sequence # | Make TCP Sequence numbers random. | TCP Header Manipulation |
| Port | 1 - 65,535 (ex. 2957) | TCP Header Manipulation |

FIG. 21

SYSTEMS AND METHODS FOR ENTERPRISE MISSION MANAGEMENT OF A COMPUTER NETWORK

BACKGROUND OF THE INVENTION

Statement of the Technical Field

The inventive arrangements relate to computer network security, and more particularly to systems for communicating between two or more logical subdivisions of a computer network where the network is dynamically maneuverable to defend against malicious attacks.

Description of the Related Art

The central weakness of current cyber infrastructure is its static nature. Assets receive permanent or infrequently-changing identifications, allowing adversaries nearly unlimited time to probe networks, map and exploit vulnerabilities. Additionally, data traveling between these fixed entities can be captured and attributed. The current approach to cyber security places technologies such as firewalls and intrusion detection systems around fixed assets, and uses encryption to protect data en route. However, this traditional approach is fundamentally flawed because it provides a fixed target for attackers. In today's globally connected communications infrastructure, static networks are vulnerable networks.

The Defense Advanced Research Projects Agency ("DARPA") Information Assurance ("IA") Program has performed initial research in the area of dynamic network defense. A technique was developed under the IA program to dynamically reassign Internet protocol ("IP") address space feeding into a pre-designated network enclave for the purpose of confusing any would-be adversaries observing the network. This technique is called DYnamic Network Address Transformation ("DYNAT"). An overview of the DYNAT technology was presented in a paper by DARPA entitled "Dynamic Approaches to Thwart Adversary Intelligence" which was published in 2001.

SUMMARY OF THE INVENTION

Embodiments of the present invention concern systems and methods for enterprise mission management of a computer network in which node operations are dynamically configurable. The methods involve configuring the computer network to operate in accordance with at least one first mission plan. The first mission plan specifies a manner in which an assigned value for at least one first IDentity Parameter ("IDP") is to be dynamically modified by at least one first node of the computer network. Thereafter, a first trigger event is detected within the computer network which indicates that a new mission plan needs to be implemented within the computer network. The first trigger event may be detected based on content of a packet being communicated within the computer network, a congestion level of the computer network, a state of the computer network, user activities within the computer network, and/or malicious attacks to the computer network.

In response to the trigger event, a second mission plan is obtained. The second mission plan specifies a manner in which an assigned value for at least one second IDP is to be dynamically modified by at least one second node of the computer network. In some scenarios, the second mission plan is obtained by: selecting a mission plan from a plurality of pre-stored mission plans based on requirements of a new mission and results from analyzing operational aspects of the computer network; automatically generating a mission plan based on requirements of a new mission and results from analyzing operational aspects of the computer network; or dynamically generating a mission plan based on at least one of a concept of operations for a mission, an architecture of the computer network, relationships between resources of the computer network, and effectiveness ratings associated with a plurality of IDPs.

Next, a determination is made as to whether any conflicts exist between operations of the second node defined by the second mission plan and operations of the first node defined by the first mission plan. If it is determined that no conflict exists between operations of the first and second nodes as defined by the first and second mission plans, then operations of the computer network are configured to further operate in accordance with the second mission plan. In contrast, if it is determined that a conflict does exist between operations of the first and second nodes as defined by the first and second mission plans, then the second mission plan is modified to obtain a third mission plan. Subsequently, a determination can be made as to whether any conflicts exist between operations of a third node defined by the third mission plan and operations of the first node defined by the first mission plan. If it is determined that no conflict exists between operations of the first and third nodes as defined by the first and third mission plans, then operations of the computer network are configured to operate in accordance with the third mission plan.

In some scenarios, the methods can also involve determining whether the computer network should continue to operate in accordance with the active first or second mission plan. If it is determined that the computer network should not continue to operate in accordance with the active first or second mission plan, then operations are performed to: re-configure the computer network such that the computer network no longer operates in accordance with the first or second mission plan; and/or re-configure the computer network to operate in accordance with a third mission plan instead of the first or second mission plan.

BRIEF DESCRIPTION OF THE DRAWINGS

Embodiments will be described with reference to the following drawing figures, in which like numerals represent like items throughout the figures, and in which:

FIG. 21 is a table that is useful for understanding some of the types of IDPs that can be modified.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Identity Agile Computer Network

Figure 1:
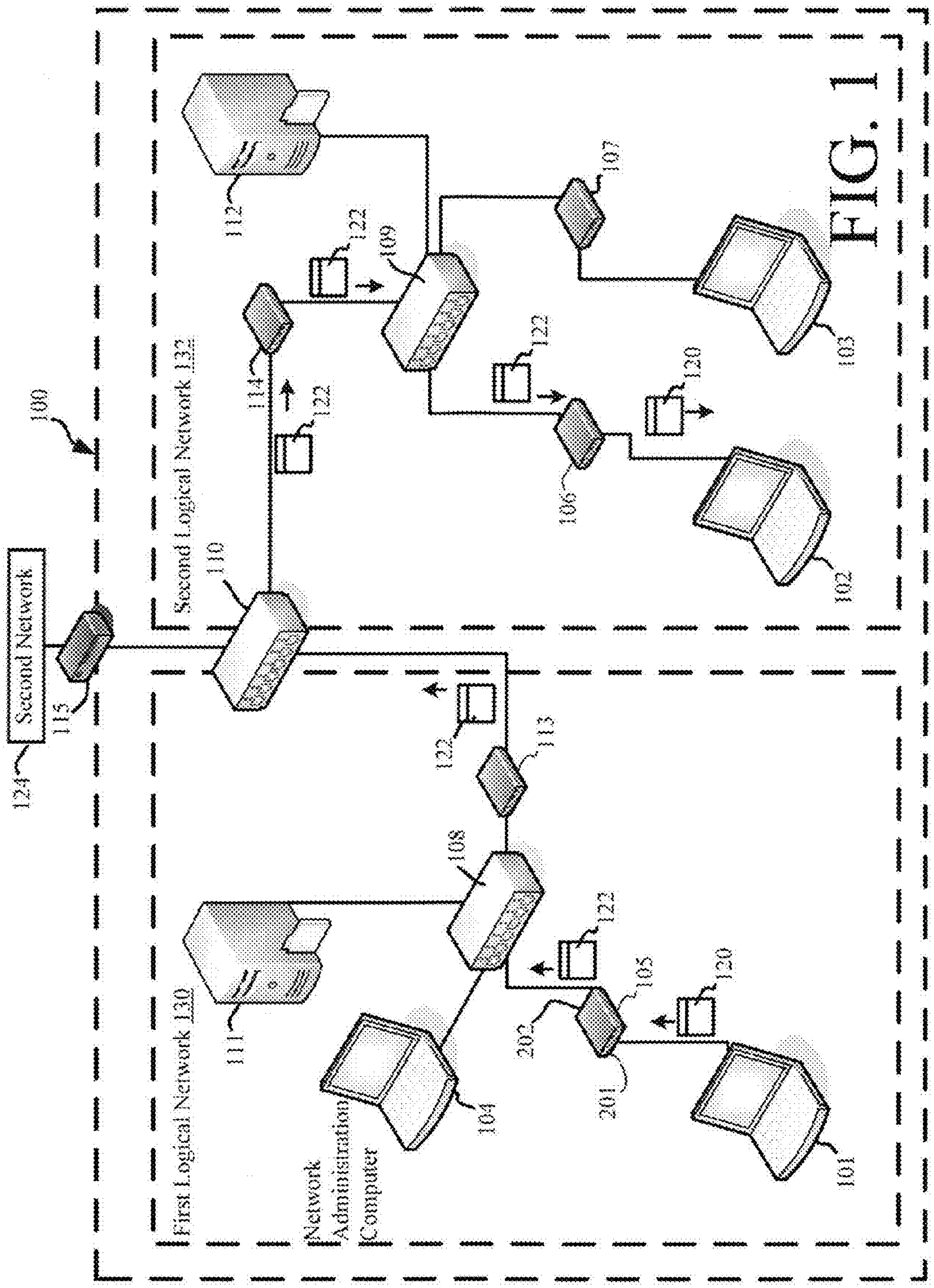
FIG. 1 is an example of a computer network that is useful for understanding the present invention.

Referring now to FIG. 1, there is shown a diagram of an exemplary computer network 100 which includes a plurality of computing devices. The computing devices can include client computers 101-103, NAC 104, servers 111, 112, network layer 2 switches 108, 109, layer 3 switch 110, and a bridge 115. The client computers 101-103 can be any type of computing device which might require network services, such as a conventional tablet, notebook, laptop or desktop computer. The layer 3 switch 110 can be a conventional routing device that routes data packets between computer networks. The layer 2 switches 108, 109 are conventional hub devices (e.g., an Ethernet hub) as are well known in the art. Servers 111, 112 can provide various computing services utilized by client computers 101-103. For example, the servers 111, 112 can be file servers which provide a location for shared storage of computer files used by client computers 101-103.

The communication media for the computer network 100 can be wired, wireless or both, but shall be described herein as a wired network for simplicity and to avoid obscuring the invention. The network will communicate data using a communication protocol. As is well known in the art, the communication protocol defines the formats and rules used for communicating data throughout the network. The computer network 100 in FIG. 1 can use any communication protocol or combination of protocols which is now known or known in the future. For example, the computer network 100 can use the well known Ethernet protocol suite for such communications. Alternatively, the computer network 100 can make use of other protocols, such as the protocols of an internet protocol suite (often referred to as the Transmission Control Protocol/Internet Protocol ("TCP/IP") suite), Synchronous Optical NETwork/Synchronous Digital Hierarchy ("SONET/SDH") based protocols, or Asynchronous Transfer Mode ("ATM") communication protocols. In some embodiments, one or more of these communication protocols can be used in combination. Although one network topology is shown in FIG. 1, the invention is not limited in this regard. Instead, any type of suitable network topology can be used, such as a bus network, a star network, a ring network or a mesh network.

The invention generally concerns a method for communicating data in a computer network (e.g., in computer network 100), where data is communicated from a first computing device to a second computing device. Computing devices within the network are represented with multiple IDPs. The phrase "identity parameters or IDPs", as used herein, can include items such as an IP address, a Media Access Control ("MAC") address, a port number and so on. However, the invention is not limited in this regard, and the IDPs can also include a variety of other information which is useful for characterizing a network node. The various types of IDPs contemplated herein are discussed below in further detail. In some scenarios, the IDPs include those parameters contained in a header and/or trailer portion of a data packet, and not those contained in a payload portion of the data packet. Still, embodiments are not limited to the particularities of these scenarios.

The inventive arrangements involve the use of Moving Target Technology ("MTT") to manipulate one or more of such IDPs for one or more computing devices within the computer network 100. This technique disguises communication patterns and network addresses of such computing devices. The manipulation of IDPs as described herein is generally performed in conjunction with data communications in the computer network 100, i.e. when data is to be communicated from a first computer in the network (e.g., client computer 101) to a second computer in the network (e.g., client computer 102). Accordingly, the IDPs that are manipulated can include those of a source computing device (i.e., the device from which the data originated) and the destination computing device (i.e., the device to which the data is being sent). The set of IDPs that is communicated is referred to herein as an IDP set. This concept is illustrated in FIG. 1, which shows that an IDP set 120 is transmitted by client computer 101 as part of a data packet (not shown).

The process according to the inventive arrangements involves selectively modifying at a first location within the computer network 100, values contained in a data packet or datagram which specify one or more identify parameters of a source computing device and/or a destination computing device. The IDPs are modified in accordance with a mission plan. The location where such modification is performed will generally coincide with the location of one module 105-107, 113, 114 of the computer network 100. Referring once again to FIG. 1, it can be observed that the modules 105-107, 113, 114 are interposed in the computer network 100 between the various computing devices which comprise nodes in such network. In these locations, the modules 105-107, 113, 114 intercept data packet communications, perform the necessary manipulations of IDPs, and retransmit the data packets along a transmission path. In alternative embodiments, the modules 105-107, 113, 114 can perform a similar function, but can be integrated directly into one or more of the computing devices. For example, the modules could be integrated into client computers 101, 102, 103, servers 111, 112, layer 2 switches 108, 109 and/or layer 3 switch 110.

Additionally, the computer network 100 can be divided into a number of logical subdivisions, sometimes referred to as sub-networks or subnets, connected through layer 3 switch 110. An enterprise network can be divided into a number of subnets for a variety of administrative or technical reasons including, but not limited to, hiding the topology of the network from being visible to external hosts, connecting networks utilizing different network protocols, separately administering network addressing schemes on the subnet level, enabling management of data traffic across subnets due to constrained data connections, and the like. Subnetting is well known in the art and will not be described in further detail.

Referring again to FIG. 1, the computer network 100 is divided into two logical networks, namely a first logical network 130 and a second logical network 132. The phrase "logical network", as used herein, refers to any logical subdivision of a computer network. In an embodiment, logical networks 130, 132 are connected through layer 3 switch 110. Layer 3 switch 110 is responsible for directing traffic between the logical networks, i.e., from client computer 101 to client computer 103. Layer 3 switch 110 is also responsible for directing traffic from any host connected to the computer network 100 bound for a second network 124. In the embodiment shown in FIG. 1, traffic routed from the computer network 100 to the second network 124 passes through bridge 115. As with the modules above, the functionality of the bridge 115 could be integrated within layer 3 switch 110.

Figure 2:
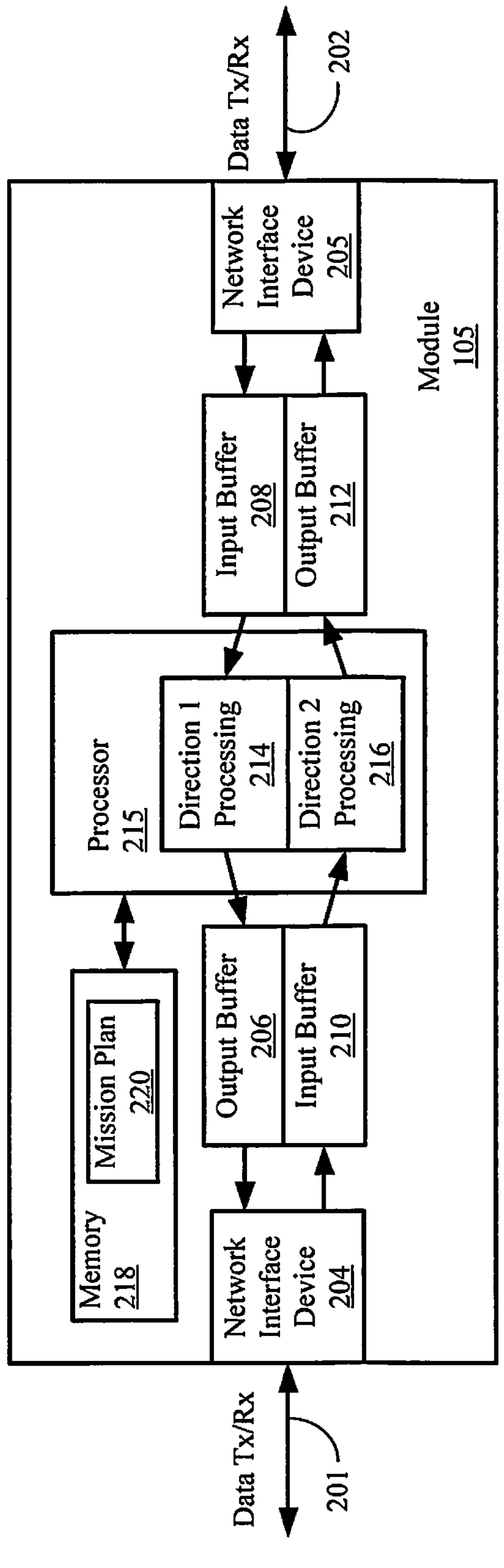
FIG. 2 is an example of a module that can be used in the present invention for performing certain manipulations of IDPs.

An example of a functional block diagram of a module 105 is shown in FIG. 2. Modules 106, 107, 113, 114 of FIG. 1 can have a similar functional block diagram as that shown in FIG. 2, but it should be understood that the invention is not limited in this regard. As shown in FIG. 2, the module 105 has at least two data ports 201, 202, each of which can correspond to a respective network interface device 204, 205. Data received at data port 201 is processed at network interface device 204 and temporarily stored at an input buffer 210. The processor 215 accesses the input data packets contained in input buffer 210 and performs any necessary manipulation of IDPs as described herein. The modified data packets are passed to output buffer 212 and subsequently transmitted from data port 202 using network interface device 205. Similarly, data received at data port 202 is processed at network interface device 205 and temporarily stored at an input buffer 208. The processor 215 accesses the input data packets contained in input buffer 208 and performs any necessary manipulation of IDPs as described herein. The modified data packets are passed to an output buffer 206 and subsequently transmitted from data port 201 using network interface device 204. In module 105, manipulation of IDPs is performed by processor 215 in accordance with a mission plan 220 stored in a memory 218.

It will be understood from FIG. 2 that the module 105 is preferably configured so that it operates bi-directionally. In such embodiments, the module 105 can implement different modification functions, depending on a source of a particular data packet. The dynamic modification function in the module 105 can be specified in the mission plan in accordance with a source computing device of a particular data packet. The module 105 can determine a source of data packets by any suitable means. For example, a source address of a data packet can be used for this purpose.

During operation, the processor 215 will determine one or more false IDP values that are to be used in place of the true IDP values. The processor 215 will transform one or more true IDP values to one or more false IDP values which are preferably specified by a pseudorandom function. Following this transformation, the module 105 will forward the modified packet or datagram to the next node of the computer network 100 along a transmission path. At subsequent points in the communication path, an adversary who is monitoring such network communications will observe false or incorrect information about the identity of computing devices communicating on the computer network 100.

IDP values will have a predetermined format that is defined by a communication protocol. For example, an IP address and a MAC address will each have a known predetermined format. Since it is a desirable that an attacker be unable to discern true IDPs from false IDPs, the false IDP values should have the same format as the true IDPs. In other words, a false IDP should have all of the correct characteristics and formatting which are normally specified for that type of IDP when using a particular network communication protocol. For purposes of the present invention, it is anticipated that IDPs may be transmitted in the clear (i.e. the information will not be encrypted). By maintaining the correct format for both true and false IDPs included in transmitted data packets, the system ensures that an adversary observing network traffic cannot effectively determine whether transmitted IDP values are actually true or false.

In some scenarios, the false IDPs that are specified by the pseudorandom function are varied in accordance with the occurrence of one or more reactive trigger events. A reactive trigger event causes the processor 215 to use the pseudorandom function to generate a new set of false IDP values into which the true IDPs are transformed. Accordingly, the reactive trigger event serves as a basis for the dynamic variation of the false IDPs described herein. Reactive trigger events are discussed in more detail below. However it should be noted that reactive trigger events for selecting a new set of false values for IDPs can be based on at least one pre-defined rule. The rule comprises a statement that defines at least one reactive trigger event. In this regard, the user rule may implement a packet inspection based scheme, congestion level based scheme, a heuristic algorithm based scheme and/or a Network-Based Attack ("NBA") analysis based scheme. Each of the listed schemes will be described in detail below.

The transformation of IDPs described above provides one way to maneuver a computer network 100 for purposes of thwarting a cyber attack. In some scenarios, the mission plan 220 implemented by processor 215 will also control certain other aspects of the manner in which computer network 100 can maneuver. For example, the mission plan 220 can specify that a dynamic selection of IDPs is manipulated. The dynamic selection can include a choice of which IDPs are selected for modification, and/or a number of such IDPs that are selected. This variable selection process provides an added dimension of uncertainty or variation which can be used to further thwart an adversary's effort to infiltrate or learn about a computer network 100. As an example of this technique, consider that during a first time period, the module 105 can modify a destination IP address and a destination MAC address of each data packet. During a second time period, the module 105 could manipulate the source IP address and a source host name in each data packet. During a third period of time, the module 105 could manipulate a source port number and a source user name. Changes in the selection of IDPs can occur synchronously (i.e., all selected IDPs are changed at the same time). Alternatively, changes in the selection of IDPs can occur asynchronously (i.e., the group of selected IDPs changes incrementally as individual IDPs are added or removed from the group of selected IDPs).

A pseudorandom function is preferably used for determining the selection of identity values that are to be manipulated or transformed into false values. In other words, the module 105 will transform only the IDPs selected by the pseudo-random function. In some scenarios, the selection of IDPs that are specified by the pseudorandom function is varied in accordance with the occurrence of a reactive trigger event. The reactive trigger event causes processor 215 to use a pseudorandom function to generate a new selection of IDPs which are to be transformed into false IDPs. Accordingly, the reactive trigger event serves as a basis for the dynamic variation of the selection of IDPs described herein. Notably, the values of the IDPs can also be varied in accordance with a pseudorandom algorithm.

The module 105 is advantageously capable of also providing a third method of maneuvering the computer network for purposes of thwarting a cyber attack. Specifically, the mission plan 220 loaded in module 105 can dynamically vary the location within the network where the modification or transformation of the IDPs takes place. Consider that modification of IDPs in an IDP set 120 sent from client computer 101 to client computer 102 could occur in module 105. This condition is shown in FIG. 1, where the IDPs contained in IDP set 120 are manipulated in module 105 so that the IDP set 120 is transformed to a new or modified IDP set 122. At least some of the IDPs in the IDP set 122 are different as compared to the IDPs in the IDP set 120. But, the location where such transformation occurs is preferably also controlled by the mission plan. Accordingly, manipulation of the IDP set 120 could, for example, sometimes occur at module 113 or 114 of FIG. 1, instead of at module 105. This ability to selectively vary the location where manipulation of IDPs occurs adds a further important dimension to the maneuvering capability of the computer network 100.

The dynamic variation in the location where IDPs are modified is facilitated by selectively controlling an operating state of each module 105-107, 113, 114 of FIG. 1. To that end, the operational states of each module 105-107, 113, 114 of FIG. 1 preferably includes (1) an active state in which data is processed in accordance with a current mission plan, and (2) a by-pass state in which packets can flow through the module as if the module was not present. The location where the dynamic modification is performed is controlled by selectively causing certain modules of the computer network 100 to be in an active state and certain modules of the computer network 100 to be in a standby state. The location can be dynamically changed by dynamically varying the current state of the modules 105-107, 113, 114 of FIG. 1 in a coordinated manner.

The mission plan 220 can include a predefined sequence for determining the locations within the computer network 100 where the IDPs are to be manipulated. Locations where IDPs are to be manipulated will change in accordance with the predefined sequence at times indicated by a reactive trigger event. For example, the reactive trigger event can cause a transition to a new location for manipulation or transformation of IDPs as described herein. Accordingly, the reactive trigger event serves as a basis for the occurrence of a change in the location where IDPs are modified, and the predefined sequence determines where the new location will be.

From the foregoing, it will be appreciated that a data packet is modified at a module 105-107, 113, 114 of FIG. 1 to include false IDPs. At some point within the computer network 100, it is necessary to restore the IDPs to their true values, so that the IDPs can be used to properly perform their intended function in accordance with the particular network protocol. Accordingly, the inventive arrangements also includes dynamically modifying, at a second location (i.e., a second module), the assigned values for the IDPs in accordance with the mission plan 220. The modification at the second location essentially comprises an inverse of a process used at the first location to modify the IDPs. The module at the second location can thus restore or transform the false value IDPs back to their true values. In order to accomplish this action, the module at the second location must be able to determine at least (1) a selection of IDP value that are to be transformed, and (2) a correct transformation of the selected IDPs from false values to true values. In effect, this process involves an inverse of the pseudorandom process or processes used to determine the IDP selection and the changes effected to such IDP values. The inverse transformation step is illustrated in FIG. 1, where the IDP set 122 is received at module 106, and the IDP values in IDP set 122 are transformed or manipulated back to their original or true values. In this scenario, module 106 converts the IDP values back to those of IDP set 120.

Notably, a module must have some way of determining the proper transformation or manipulation to apply to each data communication it receives. In some scenarios, this determination is performed by examining at least a source address IDP contained within the received data communication. For example, the source address IDP can include an IP address of a source computing device. Once the true identity of the source computing device is known, the module consults the mission plan (or information derived from the mission plan) to determine what actions it needs to take. For example, these actions could include converting certain true IDP values to false IDP values. Alternatively, these changes could include converting false IDP values back to true IDP values.

Notably, there will be instances where the source address IDP information contained in a received data communication has been changed to a false value. In those circumstances, the module receiving the data communication will not immediately be able to determine the identity of the source of the data communication. However, the module which received the communication can in such instances still identify the source computing device. This is accomplished at the receiving module by comparing the false source address IDP value to a Look-Up-Table ("LUT") which lists all such false source address IDP values in use during a particular time. The LUT also includes a list of true source address IDP values that correspond to the false source address values. The LUT can be provided directly by the mission plan 220 or can be generated by information contained within the mission plan 220. In either case, the identification of a true source address IDP value can be easily determined from the LUT. Once the true source address IDP has been determined, then the module which received the data communication can use this information to determine (based on the mission plan) what manipulations to the IDPs are needed.

Notably, the mission plan 220 can also specify a variation in the second location where IDPs are restored to their true values. For example, assume that the IDPs are dynamically modified at a first location comprising module 105. The mission plan can specify that the restoration of the IDPs to their true values occurs at module 106 as described, but can alternatively specify that dynamic modification occur instead at module 113 or 114. In some embodiments, the location where such manipulations occur is dynamically determined by the mission plan in accordance with a predefined sequence. The predefined sequence can determine the sequence of locations or modules where the manipulation of IDPs will occur.

The transition involving dynamic modification at different locations preferably occurs in accordance with a reactive trigger event. Accordingly, the predefined sequence determines the pattern or sequence of locations where data manipulations will occur, and the reactive trigger event serves as a basis for causing the transition from one location to the next. Reactive trigger events are discussed in more detail below; however, it should be noted that reactive trigger events can be based on at least one pre-defined rule. The rule comprises a statement that defines at least one reactive trigger event. In this regard, the user rule may implement a packet inspection based scheme, congestion level based scheme, a heuristic algorithm based scheme and/or an NBA analysis based scheme. Each of the listed schemes will be described below in detail. Control over the choice of a second location (i.e., where IDPs are returned to their true values) can be effected in the same manner as described above with regard to the first location. Specifically, operating states of two or more modules can be toggled between an active state and a bypass state. Manipulation of IDPs will only occur in the module which has an active operating state. The module with a bypass operating state will simply pass data packets without modification.

Alternative methods can also be used for controlling the location where manipulation of IDPs will occur. For example, a network administrator can define in a mission plan several possible modules where IDPs can be converted from true values to false values. Upon the occurrence of a reactive trigger event, a new location can be selected from among the several modules by using a pseudorandom function, and using a trigger time as a seed value for the pseudorandom function. If each module implements the same pseudorandom function using the same initial seed values then each module will calculate the same pseudorandom value. The trigger time can be determined based on a clock time, such as a GPS time or system clock time). In this way, each module can independently determine whether it is currently an active location where manipulation of IDPs should occur. Similarly, the network administrator can define in a mission plan several possible modules where dynamic manipulation returns the IDPs to their correct or true values. The selection of which module is used for this purpose can also be determined in accordance with a trigger time and a pseudorandom function as described herein. Other methods are also possible for determining the location or module where IDP manipulations are to occur. Accordingly, the invention is not intended to be limited to the particular methods described herein.

Notably, varying the position of the first and/or second locations where identity functions are manipulated will often result in varying a physical distance between the first and second location along a network communication path. The distance between the first and second locations is referred to herein as a distance vector. The distance vector can be an actual physical distance along a communication path between the first and second location. However, it is useful to think of the distance vector as representing the number of network nodes that are present in a communication path between the first and second locations. It will be appreciated that dynamically choosing different positions for the first and second locations within the network can have the effect of changing the number of nodes between the first and second locations. For example, in FIG. 1, the dynamic modification of IDPs is implemented in selected ones of the modules 105, 106, 107, 113, 114. The modules actually used to respectively implement the dynamic modification are determined as previously described. If module 105 is used for converting IDPs to false values and module 106 is used to convert them back to true values, then there are three network nodes (108, 110, 109) between modules 105 and 106. But if module 113 is used to convert to false values and module 114 is used to convert the IDPs back to true values, then there is only one network node 110 between modules 113 and 114. Accordingly, it will be appreciated that dynamically changing the position of locations where dynamic modification occurs can dynamically vary the distance vector. In some scenarios, the distance vector has a variable value which changes in accordance with an overall network behavior specified a mission plan. This variation of the distance vector provides an added dimension of variability to network maneuvering or modification as described herein.

In the present invention, the manipulation of IDP values, the selection of IDPs, and the locations where these IDPs is each defined as a maneuvering parameter. Whenever a change occurs in one of these three maneuvering parameters, it can be said that a network maneuver has occurred. Any time one of these three maneuvering parameters is changed, we can say that a network maneuver has occurred. In order to most effectively thwart an adversary's efforts to infiltrate a computer network 100, network maneuvering is preferably controlled by means of a pseudorandom process as previously described. Those skilled in the art will appreciate that a chaotic process can also be used for performing this function. Chaotic processes are technically different as compared to pseudorandom functions, but for purposes of the present invention, either can be used, and the two are considered equivalent. In some embodiments, the same pseudorandom process can be used for dynamically varying two or more of the maneuvering parameters. However, in some scenarios, two or more different pseudorandom processes are used so that two or more of these maneuvering parameters are modified independently of the others.

Reactive Trigger Events

As noted above, the dynamic changes to each of the maneuvering parameters is controlled by at least one reactive trigger. A reactive trigger is a purely spontaneous or user initiated event that causes a change to occur in relation to the dynamic modifications described herein. Stated differently, it can be said that the reactive trigger causes the network to maneuver in a new way that is different than at a previous time (i.e., before the occurrence of the reactive trigger). For example, during a first period of time, a mission plan or security model can cause an IP address to be changed from value A to value B; but after the reactive trigger event, the IP address can instead be changed from value A to value C. Similarly, during a first period of time a mission plan or security model can cause an IP address and a MAC address to be modified; but after the reactive trigger event, the mission plan or security model can instead cause a MAC address and a user name to be modified.

In its simplest form a reactive trigger can be based on a packet inspection based scheme, a congestion level based scheme, a heuristic algorithm based scheme and/or an NBA analysis based scheme. The packet inspection based scheme can involve analyzing a packet to obtain an identifier identifying an origin of the packet, a destination of the packet, a group to which the origin or destination device belongs, and/or a type of payload contained in the packet. The packet inspection based scheme can also involve analyzing the packet to determine whether a code word is contained therein or absent therefrom. Techniques for achieving such a packet inspection are well known in the art. Any such technique that is now known or known in the future can be used with the present invention without limitation. In some embodiments, a reactive trigger event occurs when a value of the identifier matches a predefined value.

In the packet inspection scenarios, the inclusion of a particular type of content in a packet serves as a trigger or as a parameter for selecting a timing scheme on which a trigger is based. For example, a trigger event could be defined as occurring (a) when a particular person of an entity (e.g., a commander of a military unit) communicates information to other members of the entity, and/or (b) when a particular code word is contained within the packet. Alternatively or additionally, a trigger event could be defined as occurring at the expiration of every N second time interval as defined by a timing scheme selected in accordance with a particular packet inspection application, where N is an integer. In this regard, it should be understood that in some embodiments a first timing scheme can be selected (a) when a first person of an entity (e.g., a commander of a military unit) requests a communication session with other members of the entity or (b) when a particular code word exists within a packet. A second different timing scheme can be selected (a) when a second person of an entity (e.g., a lieutenant commander of a military unit) requests a communication session with other members of the entity or (b) when a second code word exits within a packet, and so on. Embodiments of the present invention are not limited to the particularities of the above provided examples. In this regard, it should be understood that other content included in a packet can define a trigger event. For example, if the payload of a packet includes sensitive or confidential information, then a new mission plan or security model can be selected in accordance with the level of sensitivity or confidentiality of said information.

For such time-based trigger arrangements, one or more of the maneuvering parameters could change every N (e.g., 60) seconds in accordance with a predetermined clock time. In some embodiments, all of the maneuvering parameters can change concurrently so that the changes are synchronized. In a slightly more complex embodiment, a time-based trigger arrangement can also be used, but a different unique trigger time interval can be selected for each maneuvering parameter. Thus, false IDP values could be changed at time interval X, a selection of IDPs would change in accordance with a time interval Y, and a location where such changes are performed would occur at time interval Z, where X, Y and Z are different values.

It will be appreciated that in embodiments of the invention which rely upon clock time as a trigger mechanism, it is advantageous to provide synchronization as between the clocks in various modules 105, 106, 107, 113, 114 to ensure that packets are not lost or dropped due to unrecognized IDPs. Synchronization methods are well known and any suitable synchronization mechanism can be used for this purpose. For example, the modules could be synchronized by using a highly accurate time reference such as a GPS clock time. Alternatively, a unique wireless synchronization signal could be broadcast to each of the modules from a central control facility.

The congestion level based scheme can involve: monitoring and tracking the level of congestion within a computer network; comparing a current level of congestion with a threshold value; and selecting a mission plan or security model from a plurality of mission plans/models based on the results of the comparison. In some scenarios, a new mission plan or security model is selected when the current level of congestion is equal to, greater than or less than the threshold value. In this way, a mission plan or security model change occurs at apparently erratic time intervals based on changes in the level of congestion within a computer network.

The heuristic algorithm based scheme can involve analyzing a network to determine a state thereof. Such a network analysis can involve monitoring traffic patterns (e.g., the number of users), protocol patterns, and/or entropy patterns (i.e., who is communicating with who) of a network at particular times of a day. A traffic pattern can be determined by collecting information about network equipment usage (e.g., a processor's usage) and a number of connections that exist from a network device (e.g., a network server). The collected information can be compared against the contents of a pre-defined table or matrix to identify which of a plurality of possible traffic patterns currently exists within a computer network. Based at least on the results of this comparison operation, a new mission plan or security model can be selected from a plurality of mission plans and/or security models for utilization in the computer network.

In some heuristic scenarios, the mission plans and/or security models can be configured such that a constant high level of traffic is maintained within a computer network despite changes in the amount of actual traffic therein. The constant high level of traffic is maintained by adjusting (i.e., increasing or decreasing) a noise level of a network in accordance with the amount of actual traffic therein. Consequently, the amount of actual traffic and the type of traffic pattern at any given time is masked.

A protocol pattern can be determined by collecting information about user activities related to network resources. Such information can include, but is not limited to, a history of user activities for at least one user of a computer network, times that user activities start, times that user activities stop, times that user activities have elapsed, and information identifying concurrent user activities being performed by at least one user of a computer network. The collected information can be analyzed to determine if a certain protocol pattern currently exists. If it is determined that a particular protocol pattern currently exists, then a new mission plan or security model can be selected from a plurality of mission plans/models for utilization in the computer network. In this way, a mission plan or security model change occurs at apparently erratic time intervals based on changes in protocol patterns (more particularly, changes in user activities).

The entropy pattern can be determined by collecting information about who is communicating with each other over the computer network. Based on the collected information, a new mission plan or security model is selected from a plurality of mission plans/models for utilization in the computer network. In this scenario, a mission plan or security model change occurs at apparently erratic time intervals based on changes of the parties participating in communication sessions.

The NBA analysis is performed for purposes of determining the level of an NBA, a type of an NBA, and/or the number of NBA attacks currently being waged on a computer network. Such NBA analyses are well known in the art, and therefore will not be described herein. Still, it should be understood that such NBA analyses can involve: monitoring and tracking attack events within a computer network; and performing LUT operations for purposes of determining the level of an NBA attack and/or the type of an NBA attack. Any NBA analysis technique that is now known or known in the future can be used with the present invention without limitation. Once the NBA analysis is completed, a new mission plan or security model can be selected from a plurality of mission plans/models for utilization in the computer network based on the results of the NBA analysis. For example, if it has been determined that an NBA is a low level NBA and/or is of a first type, then a first mission plan or security model is selected from a plurality of mission plans or security models. In contrast, if it has been determined that the NBA is a high level NBA and/or is of a second type, then a second different mission plan or security model is selected from the plurality of mission plans or security models. In this scenario, a mission plan or security model change occurs at apparently erratic time intervals based on changes in the level of NBA attacks and/or the types of NBA attacks. Additionally or alternatively, a new mission plan or security model can be selected when two or more NBA attacks of the same or different levels and/or types are currently being waged on the computer network. In this scenario, a mission plan or security model change occurs at apparently erratic time intervals based on changes in the number of attacks currently being performed.

In embodiments of the present invention, an NBA can be identified by a network security software suite. Alternatively, the NBA can be identified upon the receipt of a data packet at a module 105, 106, 107, 113, 114 where the packet contains one or more IDPs that are inconsistent with the present state of network maneuvering. Regardless of the basis for identifying an NBA, the existence of such NBA can serve as a reactive trigger event as described above.

Reactive trigger events based on the above described schemes can cause the same types of network maneuvers. For example, false IDPs, the selection of IDPs and the locations of IDP transformations could remain stable (i.e., unchanged) except in the case where one or more of the following is detected: a packet having a particular origin or destination; a code word contained in a packet; secret or confidential information contained in a packet; a particular level of congestion; a particular traffic pattern; a particular protocol pattern; a particular entropy pattern; an NBA of a particular level and/or type; and a particular number of NBAs currently being waged on a computer network. Such an arrangement might be chosen, for example, in computer networks where frequent network maneuvering is desirable so as to increase the security thereof.

Alternatively, reactive trigger events based on the above described schemes can cause different types of network maneuvers. In such embodiments, a trigger event based on the results of an NBA analysis can have a different effect on the network maneuvering as compared to a trigger event based on the results of a packet inspection and/or a heuristic algorithm. For example, an NBA-based trigger event can cause strategic or defensive changes in the network maneuvering so as to more aggressively counter such NBAs. The precise nature of such measures can depend on the nature of the threat, but can include a variety of responses. For example, different pseudorandom algorithms can be selected, and/or the number of IDPs selected for manipulation in each IDP set 120 can be increased. Also, the response can include increasing a frequency of network maneuvering. Thus, more frequent changes can be made with respect to (1) the false IDP values, (2) the selection of IDPs to be changed in each IDP set, and/or (3) the position of the first and second locations where IDPs are changed. Accordingly, the network maneuvering described herein provides a method for changing a mission plan or security model in a purely spontaneous manner based on a variety of factors, thereby increasing the security thereof.

Mission Plans

The network maneuvering described herein is controlled in accordance with a mission plan. A mission plan is a schema that defines and controls maneuverability within the context of a network and at least one security model. As such, the mission plan can be represented as a data file that is communicated from the NAC 104 to each module 105-107, 113-114 of FIG. 1. The mission plan is thereafter used by each module to control the manipulation of IDPs and coordinate its activities with the actions of the other modules in the network.

In some scenarios, a mission plan includes, but is not limited to, the following source side information: device identification information; IDP identification information for those IDPs that are to have their true values changed to false values; true IDP values; a set of false IDP values (e.g., $FV_1$, $FV_2$, . . . , $FV_X$); timing information specifying when to use each false value of the set of false IDP values; a pseudo-random or chaotic function for dynamically generating new false values for the set of false IDP values; rules specifying when to invoke the pseudo-random or chaotic function for generating the new values for the set of false IDP values; rules specifying when to dynamically select which IDPs are to have their true values changed to false values; a rule specifying the number of IDPs to be selected and which IDPs are to be selected for value modification; a rule specifying whether IDPs are to be changed synchronously (i.e., all selected IDPs are changed at the same time) or asynchronously (i.e., the group of IDPs change incrementally as individual IDPs are added or removed from the group of selected IDPs); and a rule for dynamically varying the location within the computer network where the modification or transformation of IDPs takes place. The mission plan may also include the following destination side information: first rules for restoring false values of IDPs to true values; and second rules for dynamically varying the location within the computer network where the modification or restoration of the IDP values takes place. The first rules can include, but are not limited to, rules for determining at least a selection of IDP values that are to be transformed, and/or rules for correct transformation of the selected IDPs from false values to true values (e.g., using at least one LUT). Embodiments of the present invention are not limited in this regard. The source side and destination side information may alternatively be contained in at least two separate mission plans.

A mission plan can be modified from time to time manually by a network administrator and/or automatically by the NCSA to update or change the way in which the network maneuvers to thwart potential adversaries. As such, the mission plan may provide a network administrator and/or the NCSA with a means for complete control over the time, place and manner in which network maneuvering will occur within the network. Such update ability allows the network administrator and/or the NCSA to tailor the behavior of the computer network to the current operating conditions and more effectively thwart adversary efforts to infiltrate the network.

Multiple mission plans can be manually defined by a user and/or automatically generated by the NCSA. The mission plans can then be stored so that they are accessible to modules within the network. For example, the multiple mission plans can be stored at NAC 104 and communicated to modules as needed. Alternatively, a plurality of mission plans can be stored on each module and can be activated as necessary or desirable to maintain security of the network. For example, if the network administrator and/or NCSA determines or suspects that an adversary has discovered a current mission plan for a network, the administrator and/or NCSA may wish to change the mission plan. Effective security procedures can also dictate that the mission plan be periodically changed.

Manual Generation of Mission Plans

Figure 3:
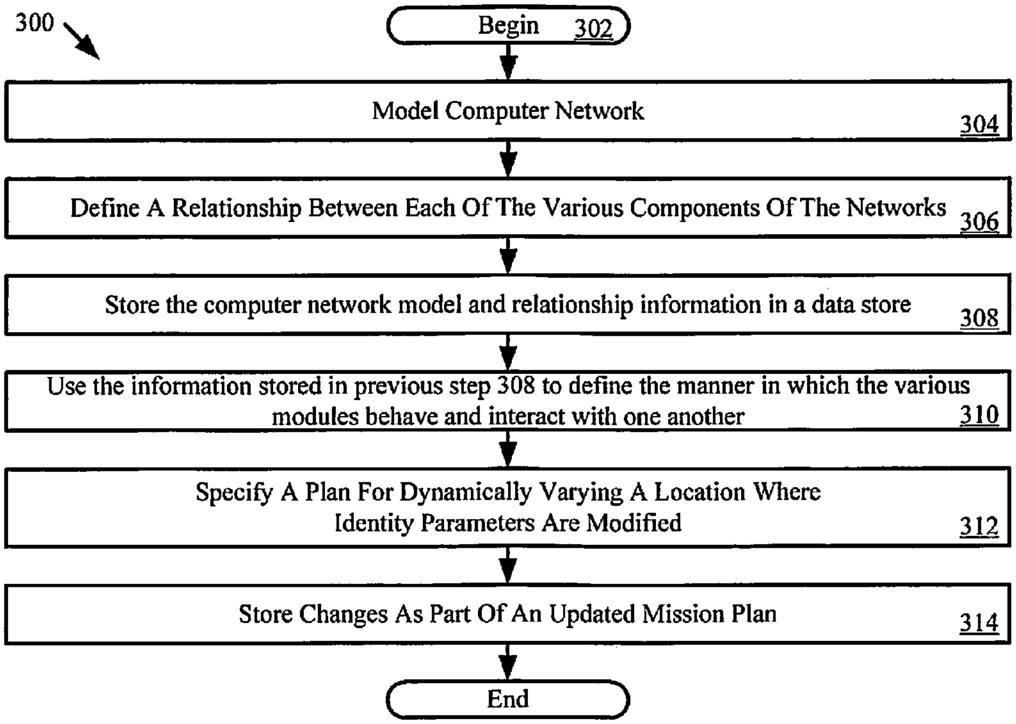
FIG. 3 is a flow diagram of an exemplary process for manually generating a mission plan.

Referring now to FIG. 3, there is provided a flow diagram of an exemplary process 300 for manually generating a mission plan. The order of the method steps shown in FIG. 3 is exemplary. The present invention is not limited to this order. For example, steps 308-312 can be performed in any sequential order or alternatively in parallel.

The process of generating a mission plan can begin by modeling the computer network 100, as shown by step 302. The creation of the model is facilitated by the NCSA executing on a computer or server at the network command center. For example, in the embodiment shown in FIG. 1, the NCSA can execute on the NAC 104 of FIG. 1. The network model preferably includes information which defines data connections and/or relationships between various computing devices included in the computer network 100. The NCSA will provide a suitable interface which facilitates entry of such relationship data. In some scenarios, the NCSA can facilitate entry of data into tables which can be used to define the mission plan. However, in other scenarios, a graphic user interface is used to facilitate this process.

Figure 4:
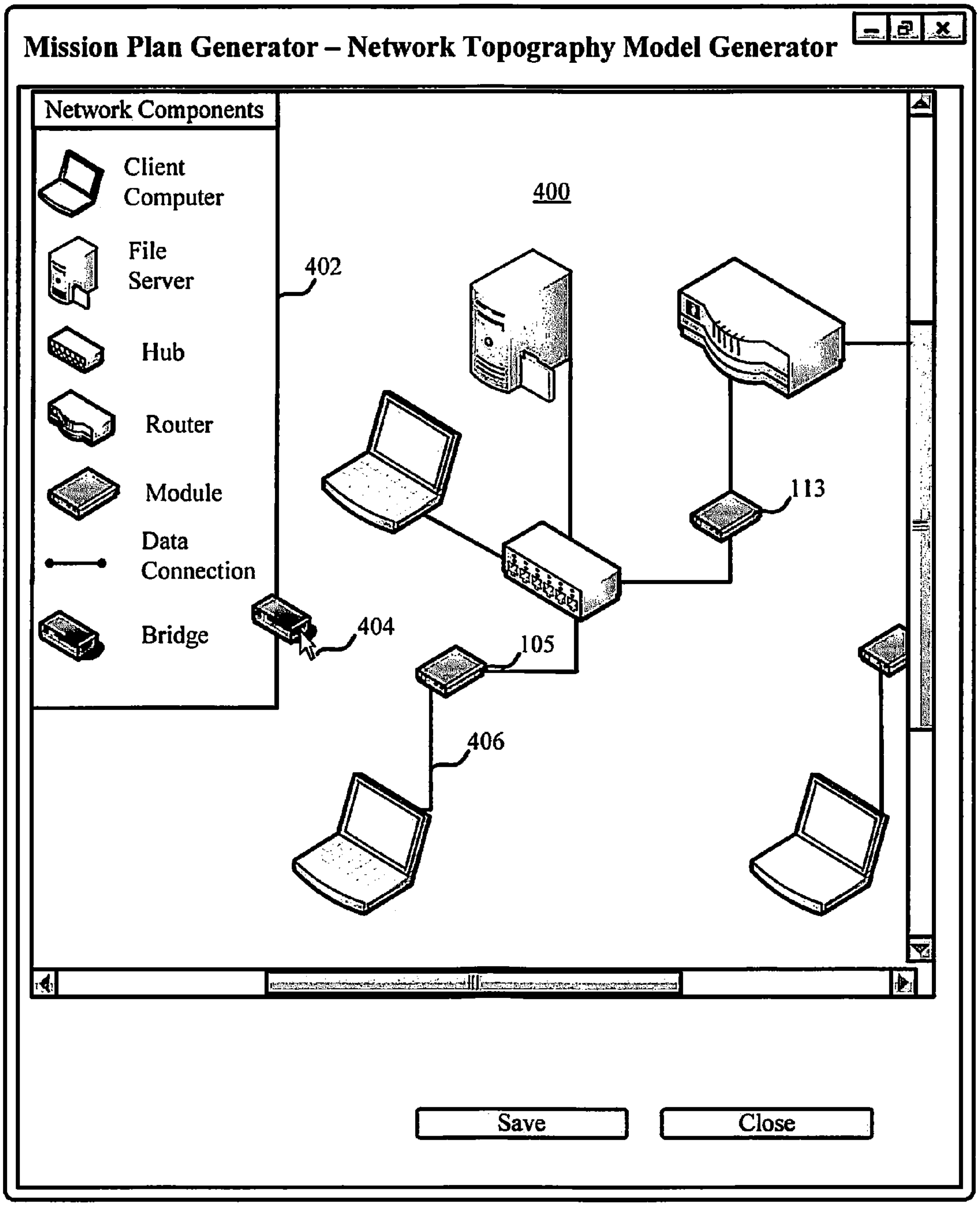
FIG. 4 is a drawing that is useful for understanding a tool that can be used to help characterize the network in FIG. 1.

In a next step 304, the network administrator performs user-software interactions for defining the relationship between each of the various components of the networks. In some scenarios, these user-software interactions are achieved using a Network Topography Model Generator ("NTMG") tool provided by the NCSA. The NTMG tool is used to assist the network administrator in defining the relationship between each of the various components of the networks. The NTMG tool provides a workspace 400 as shown in FIG. 4 in which the network administrator can drag and drop network components 402, by using a cursor 404. The network administrator can also create data connections 406 between various network components 402. As part of this modeling process, the network administrator can provide network address information for the various network components, including the modules 105-107, 113, 114 of FIG. 1.

Once the network has been modeled, it can be saved in a data store of the system as shown by step 308 of FIG. 3. Thereafter, the network administrator uses the stored information to define the manner in which the various modules 105-107, 113, 114 behave and interact with one another. In this regard, the NCSA can generate a GUI (e.g., a window or a dialog box) of which can be used by the network administrator to further develop a mission plan. A schematic illustration of an exemplary embodiment 500 of this GUI is provided in FIG. 5.

Figure 5:
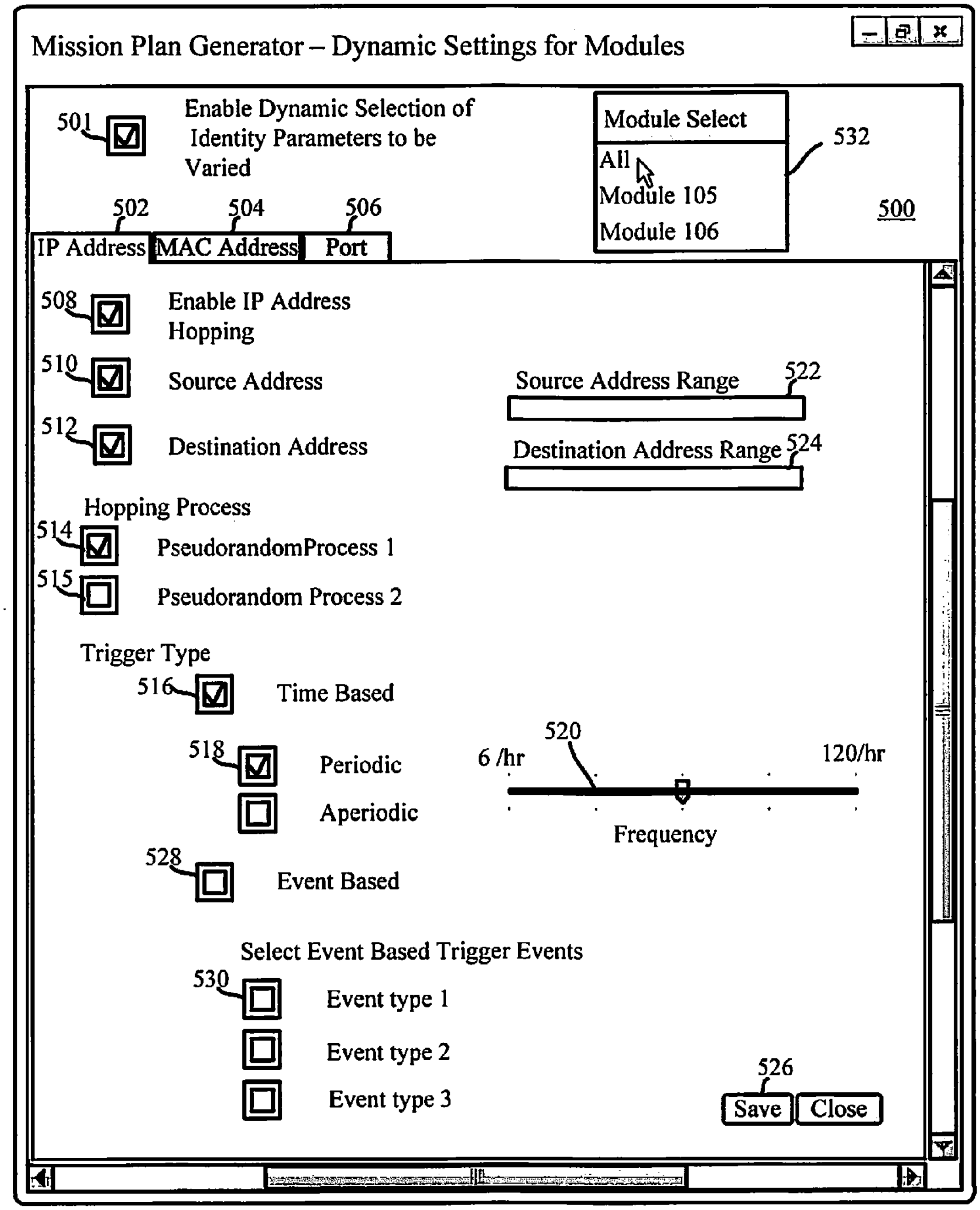
FIG. 5 is an example of a Graphical User Interface ("GUI") that can be used to select dynamic settings for modules in FIG. 1.

As shown in FIG. 5, a drop-down menu 532 can be used to select the particular module (e.g., module 105 of FIG. 1) to which the settings in GUI 500 are to be applied. Alternatively, the network administrator can use drop-down menu 532 to indicate that the settings in GUI 500 are intended to be applied to all modules within the network (e.g., by selecting the command "All" in the drop-down menu 532). The process can continue by specifying whether a fixed set of IDPs will always be modified in each of the modules, or whether the set of IDPs that are manipulated shall be dynamically varied. If the selection or set of IDPs that are to be manipulated in the modules is intended to be dynamically varied, the network administrator can mark check-box 501 to indicate that preference. If the check-box 501 is not marked, then the set of IDPs to be varied is a fixed set that does not vary over time.

The GUI 500 includes tabs 502, 504, 506 which allow a user to select the particular IDP that (s)he wants to work with for purposes of creating a mission plan. For purposes of this disclosure, the GUI 500 facilitates dynamic variation of only three IDPs. Specifically, these include the IP address, MAC address and port address. More or fewer IDPs can be dynamically varied by providing additional tabs, but the three IDPs noted are sufficient to explain the inventive concepts. In FIG. 5, the user has selected the tab 502 to work with the IP address type of IDP. Within tab 502, a variety of user interface controls 508-520 are provided for specifying the details relating to the dynamic variation of IP addresses within the selected module. More or fewer controls can be provided to facilitate the dynamic manipulation of the IP address type, and the controls shown are merely provided to assist the reader in understanding the concept. In the example shown, the network administrator can enable dynamic variation of IP addresses by selecting (e.g., with a pointing device such as a mouse) the check-box 508 marked: "Enable IP Address Hopping". Similarly, the network administrator can indicate whether the source address, destination address or both are to be varied. In this example, the source and destination address boxes 510, 512 are both marked, indicating that both types of addresses are to be changed. The range of allowed values for the source and destination addresses can be specified by the administrator in list boxes 522, 524.

The particular pseudorandom process used to select false IP address values is specified by selecting a pseudorandom process. This selection is specified in boxes 514, 515. Different pseudorandom processes can have different levels of complexity for variable degrees of true randomness, and the administrator can choose the process that best suits the needs of the computer network 100.

GUI 500 also allows a network administrator to set the trigger type to be used for the dynamic variation of the IP address IDP. In this example, the user has selected box 516, indicating that a time based trigger is to be used for determining when to transition to new false IP address values. Moreover, checkbox 518 has been selected to indicate that the time based trigger is to occur on a periodic basis. Slider 520 can be adjusted by the user to determine the frequency of the periodic time based trigger. In the example shown, the trigger frequency can be adjusted between six trigger occurrences per hour (trigger every ten minutes) and one hundred twenty trigger occurrences per hour (trigger every thirty seconds). In this example, selections are available for other types of triggers as well. For example, dialog box 502 includes check boxes 528, 530 by which the network administrator can select an event-based trigger. Several different specific event types can be selected to form the basis for such event-based triggers (e.g., Event type 1, Event type 2, etc.). These event types can include the detection of various potential computer network security threats. In FIG. 5, tabs 504 and 506 are similar to tab 502, but the controls therein are tailored to the dynamic variation of the MAC address and port value rather than the IP address. Additional tabs could be provided for controlling the dynamic variation of other types of IDPs.

Referring again to FIG. 3, the process 300 continues with step 312 where the network administrator specifies a plan for dynamically varying the location where IDPs are modified. In some embodiments, this variable location feature is facilitated by controlling a sequence that defines when each module is in an active state or a bypass state. Accordingly, the NCSA advantageously includes some GUI means of specifying this sequence. In some embodiments of the invention, this can involve the use of defined time intervals or time slots, which are separated by the occurrence of a trigger event. A schematic illustration of an exemplary GUI 600 that facilitates such specifications by the network administrator is provided in FIG. 6.

Figure 6:
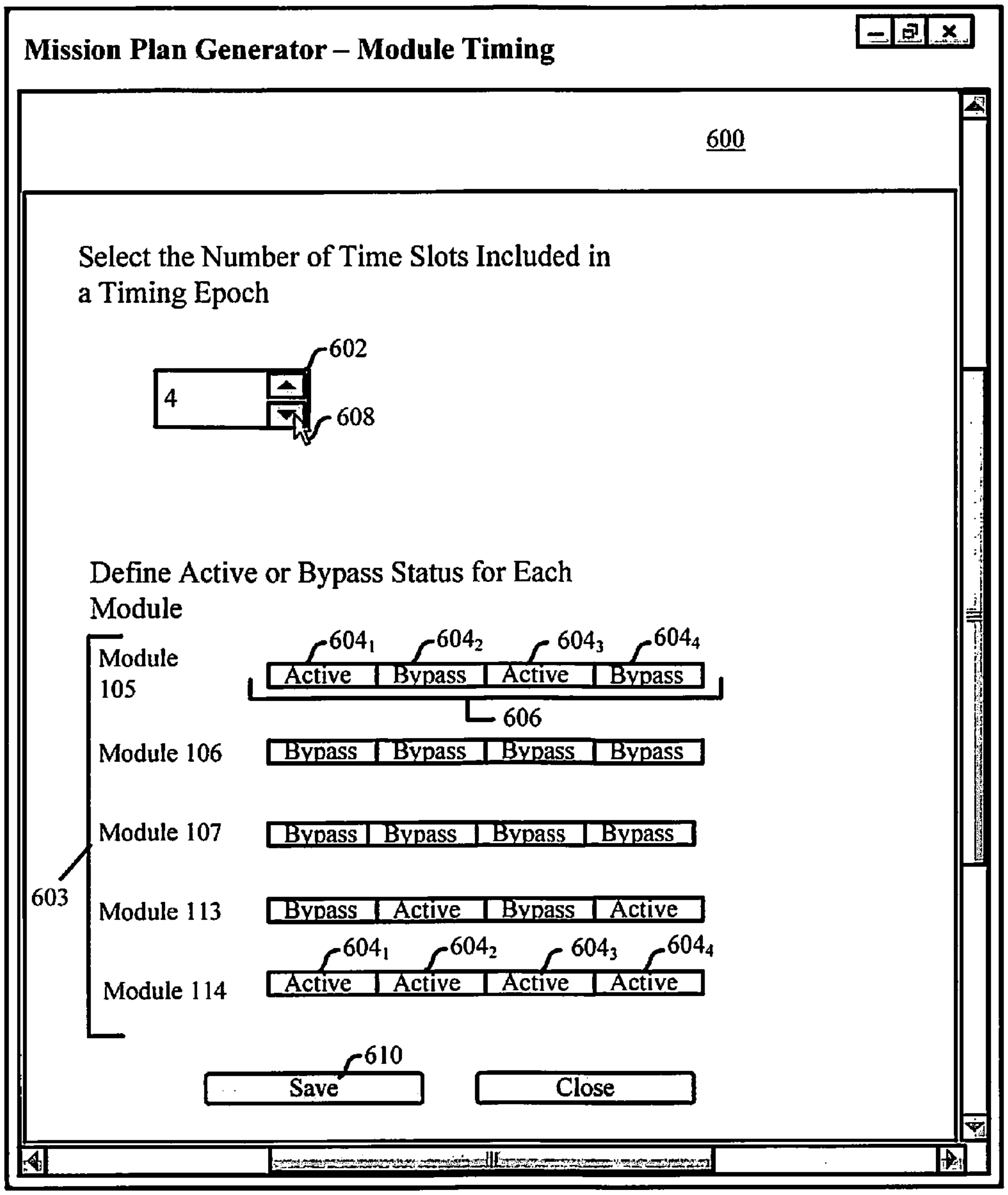
FIG. 6 is an example of a GUI that can be used to select a sequence of active states and bypass states associated with each module in FIG. 1.

As shown in FIG. 6, a GUI 600 can be provided by the NCSA to facilitate coordination and entry of location sequence and timing information. GUI 600 can include a control 602 for selecting a number of time slots $\mathbf{604}_1$-$\mathbf{604}_n$ which are to be included within a time epoch 606. In the example illustrated, the network administrator has defined four time slots per timing epoch. The GUI 600 can also include a table 603 which includes all modules in the computer network 100. For each module listed, the table includes a graphical representation of available time slots $\mathbf{604}_1$-$\mathbf{604}_4$ for one timing epoch 606. Recall that dynamic control over the location where IDPs are manipulated is determined by whether each module is in an active or bypass operating states. Accordingly, within the GUI, the user can move a cursor 608 and make selections to specify whether a particular module is in an active or bypass mode during each time slot. In the example shown, module 105 is active during time slot $\mathbf{604}_1$ and $\mathbf{604}_3$, but is in a bypass mode during time slots $\mathbf{604}_2$, $\mathbf{604}_4$. Conversely, module 113 is active during time slots $\mathbf{604}_2$, $\mathbf{604}_4$, but is in bypass mode during time slots $\mathbf{604}_1$ and $\mathbf{604}_3$. With reference to FIG. 1, this means that manipulation of IDPs occurs at a location associated with module 105 during time slots $\mathbf{604}_1$ and $\mathbf{604}_3$, but occurs instead at module 113 during time slots $\mathbf{604}_2$, $\mathbf{604}_4$.

In the example shown in FIG. 6, the network administrator has elected to have module 114 always operate in an active mode (i.e., module 114 is active during all time slots). Accordingly, for data communications transmitted from client computer 101 to client computer 103, data packets will alternately be manipulated in modules 105, 113, but will always be manipulated at module 114. Finally, in this example, the network administrator has elected to maintain modules 106 and 107 in a bypass mode during time slots $\mathbf{604}_1$-$\mathbf{604}_4$. Accordingly, no manipulation of IDPs will be performed at these modules during any of the defined time slots.

Referring again to FIG. 3, the network administrator can store the changes as part of an updated mission plan, as shown by step 314. For example, once the module timing has been defined in GUI 600, the network administrator can select the button 610 of FIG. 6 to store the changes as part of an updated mission plan. The mission plan can be saved in various formats. In some embodiments, the mission plan can be saved as a simple table or other type of defined data structure that can be used by each module for controlling the behavior of the module.

In some scenarios, an existing mission model may need to be modified manually by an operator in the field during operation. Mission models contain a set of relationships that allow the missions to operate. Mission models may need to be modified for: (a) changing what needs to be protected; (b) allowing different kinds of communications; and (c) changing security levels based on mission attack levels. Accordingly, one method for modifying a mission model involves: selecting pieces of the mission models; and creating a new mission model. The new mission model can be created by: adding to an existing mission model; joining or combining two or more existing mission models; subtracting parts from an existing mission model; splitting an existing mission model into two or more mission models; modifying parameters of an existing mission model; copying a mission model and modifying the mission model copy; and/or deleting a mission model. Mission models generally control maneuverability. As such, mission models include information specifying a strategy of movement, a strategy of when to evoke movement and what to mode, a strategy of cloaking, a strategy of shadow networking, and/or a strategy of communication groups. One or more of these strategies can be changed to create the new mission model.

Automatic And Dynamic Generation of Mission Plans

In some scenarios, at least one mission plan is dynamically and automatically generated by the NCSA during operation of the computer network (e.g., computer network 100 of FIG. 1). The dynamic generation of a mission plan is achieved by considering (1) the CONcept of OPerationS ("CONOPS"), (2) the computing infrastructure resources and network assets, (3) the relationships between the infrastructure resources and network assets, (4) the detected activity within the computer network, and/or (5) effectiveness ratings associated with IDPs.

Figure 7:
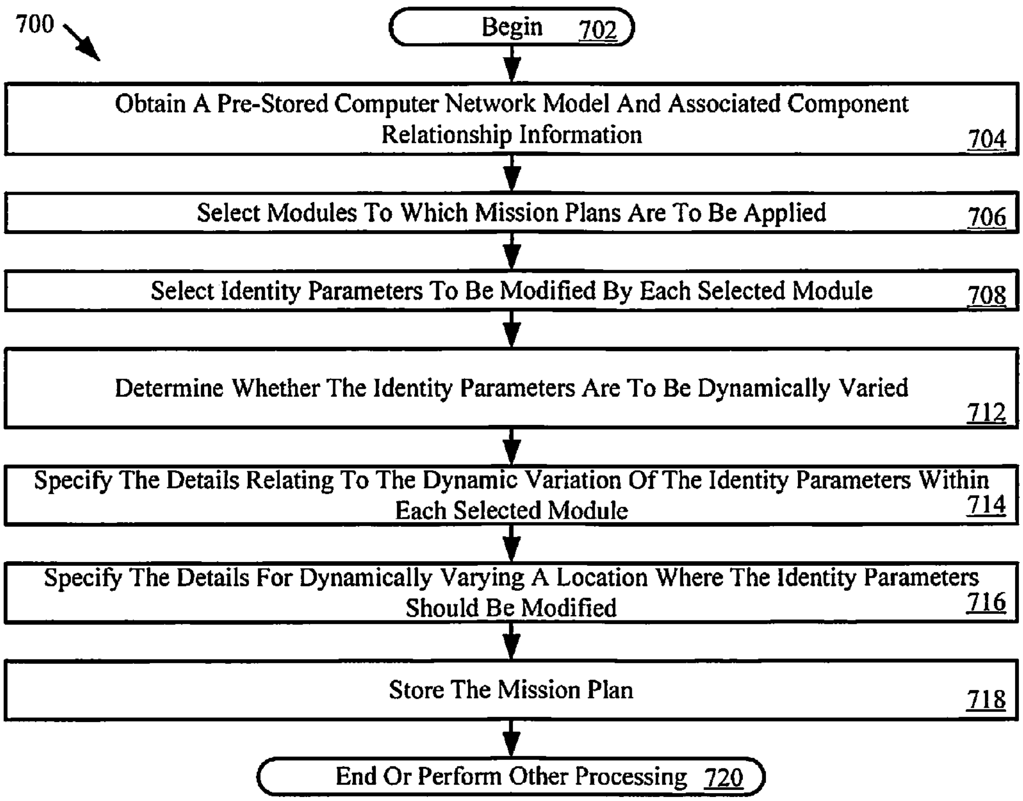
FIG. 7 is a flow diagram of an exemplary process for automatically and dynamically generating a mission plan.

A flow diagram of an exemplary automatic process 700 performed by the NCSA for dynamically generating mission plans is provided in FIG. 7. The order of the method steps shown in FIG. 7 is exemplary. The present invention is not limited to this order. For example, two or more of the method steps can be performed in any sequential order or alternatively in parallel.

As shown in FIG. 7, process 700 begins with step 702 and continues with step 704. In step 704, a pre-stored computer network model and associated component relationship information is obtained by the NCSA. Next, in step 706, the NCSA performs operations to select modules of the computer network model (e.g., modules 105, 106, 107, 113 and/or 114 of FIG. 1) to which at least one mission plan is to be applied.

Thereafter, in step 708, at least one IDP to be modified is selected for each of the selected modules. In some scenarios, the IDP(s) include(s), but is not limited to, an IP address, a MAC address and/or a port number. The IDP(s) can be selected based on (1) the CONOPS, (2) the type of attack on the computer network which was previously detected by the NCSA, and/or (3) the effectiveness rating associated with the IDPs. For example, if the CONOPS objective is to maintain confidential communications and the type of malicious attack detected on the computer network is a Level 1 attack, then the IDP(s) include(s) the IDP(s) with an effectiveness rating of Level 1 (e.g., only an IP address). In contrast, if the CONOPS objective is to maintain confidential communications and the type of malicious attack detected on the computer network is a Level 2 attack, then the IDP(s) include(s) the IDP(s) with an effectiveness rating of Level 2 (e.g., an IP address and a port number). If the CONOPS objective is to maintain confidential communications and the type of malicious attack detected on the computer network is a Level 3 attack, then the IDP(s) includes the IDP(s) with an effectiveness rating of Level 3 (e.g., an IP address and a MAC address). If the CONOPS objective is to maintain confidential communications and the type of malicious attack detected on the computer network is a Level 4 attack, then the IDP(s) includes the IDP(s) with an effectiveness rating of Level 4 (e.g., an IP address, a MAC address, and a port number). Embodiments of the present invention are not limited to the particularities of this example.

Next in step 712, a determination is made as to whether the IDP(s) is(are) to be dynamically varied. If the IDP(s) is(are) to be dynamically varied, then step 714 is performed where the details relating to the dynamic variations are specified. In this regard, step 714 can involve: enabling IDP hopping for each IDP to be dynamically varied; indicating whether source and/or destination IDP(s) is(are) to be varied; specifying a range of allowed values for each IDP; select a pseudo-random function or a chaotic function to be used to generated false values for each IDP; and/or setting a trigger type to be used for the dynamic variation of a value for each IDP. Each of these listed operations can be based on (1) the CONOPS objectives and/or (2) the type of detected activity within the computer network. For example, if the CONOPS objective is to maintain the secrecy of all communication sources and a Level 1 attack has been detected, then only source IDPs are to be dynamically modified based on a first pseudo-random function. In contrast, if the CONOPS objective is to maintain the secrecy of all communication destinations and a Level 2 attack has been detected, then only the destination source IDPs are to be dynamically modified based on a second different pseudo-random function. If the CONOPS objective is to maintain the secrecy of all communication sources/destinations and a Level 3 attack has been detected, then the source/destination IDPs are to be dynamically modified based on at least one third different pseudo-random function. If the CONOPS objective is to maintain the secrecy of all communication sources/destinations and a Level 4 attack has been detected, then the source/destination IDPs are to be dynamically modified based on at least one chaotic function. Embodiments of the present invention are not limited to the particularities' of this example.

Upon completing step 714, step 716 is performed where the additional details are specified for dynamically varying a location where the IDPs should be modified. In this regard, step 716 involves selecting the number of timeslots which are to be included within a time epoch for each of the selected modules. This selection can be based on a distance vector, which is described above. In some scenarios, the distance vectors have variable values which change in accordance with an overall network behavior specified the mission plans. In a next step 718, the mission plan(s) is(are) stored. Subsequently, process 700 ends or other processing is performed.

In some scenarios, a mission model may need to be automatically modified during operation. Mission models contain a set of relationships that allow the missions to operate. Mission models may need to be modified for: (a) changing what needs to be protected; (b) allowing different kinds of communications; and (c) changing security levels based on mission attack levels. Accordingly, one method for modifying a mission model involves: selecting pieces of the mission models; and creating a new mission model. The mission model can be created by: adding to an existing mission model; joining or combining two or more existing mission models; subtracting parts from an existing mission model; splitting an existing mission model into two or more mission models; modifying parameters of an existing mission model; copying a mission model and modifying the mission model copy; and/or deleting a mission model. Mission models generally control maneuverability. As such, mission models include information specifying a strategy of movement, a strategy of when to evoke movement and what to mode, a strategy of cloaking, a strategy of shadow networking, and/or a strategy of communication groups. One or more of these strategies can be modified to create the new mission model.

Mission Plan Conflict Analysis

Once two or more mission plans have been generated, the NCSA performs operations to identify and resolve any conflicts between module operations defined thereby. In some scenarios, the conflict analysis is performed each time a new mission plan is generated by the network administrator and/or the NCSA, and prior to distribution and loading of the new mission plan as described below.

Figure 8:
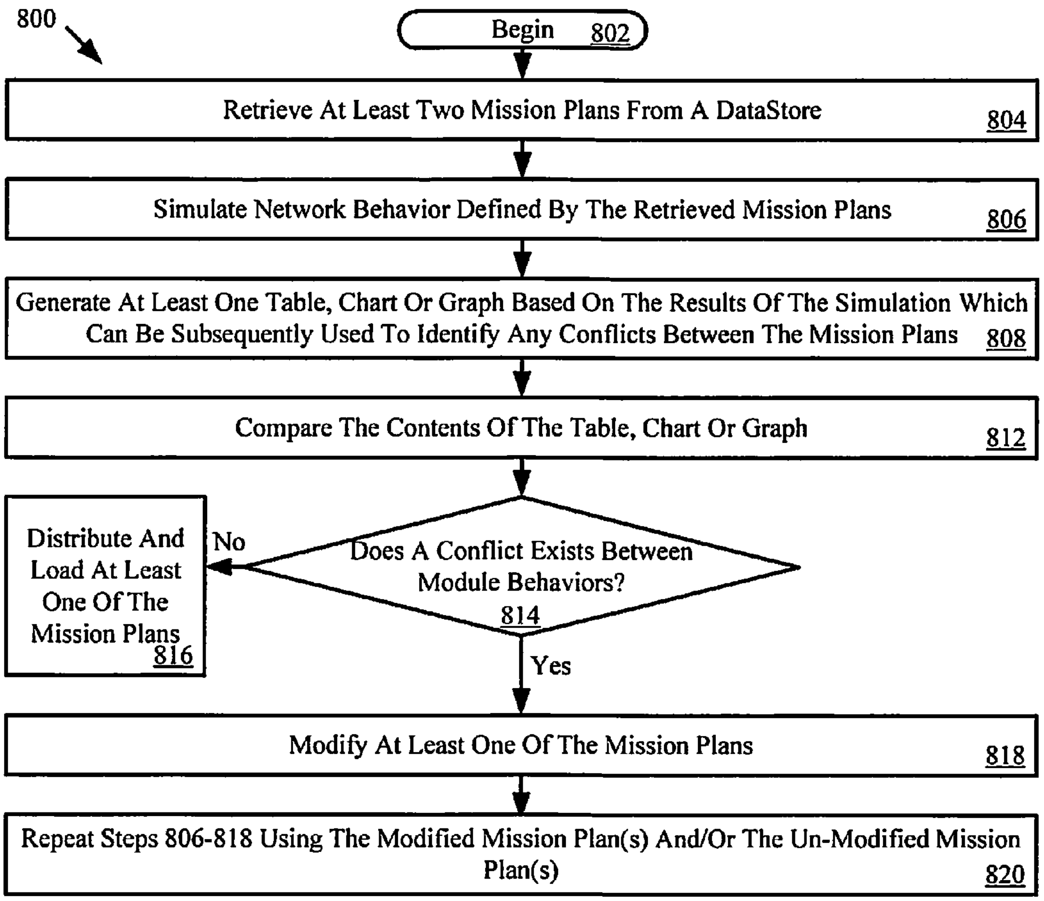
FIG. 8 is an exemplary process for identifying and resolving mission plan conflicts.

A schematic illustration of an exemplary process 800 for identifying and resolving mission plan conflicts is provided in FIG. 8. As shown in FIG. 8, process 800 begins with step 802 and continues with step 804. In step 804, at least two mission plans are retrieved from a data store. The retrieved mission plans can include, but are not limited to, a newly generated mission plan (i.e., one that has not yet been distributed and loaded) and/or a pre-generated mission plan (i.e., one that was pre-generated but has or has not been distributed and loaded).

The retrieved mission plans are then used in step 806 for simulating the network behavior defined thereby. For example, a first mission plan specifies that: a true value of a first source IP address is to be modified to a false value at module 105 during a first pre-defined time period; the false value is to be selected from a defined set of false values based on a first pseudo-random function; and the false value is to be re-selected every ten seconds. A second mission plan specifies that: a true value for a second source IP address is to be modified to a false value at module 105 during a second pre-defined period of time that at least partially overlaps the first pre-determined period of time; the false value is to be dynamically selected from a defined set of false values based on a second pseudo-random function; and the false value is to be re-selected every hour. In this case, the operations of module 105 are simulated as defined in the first and second mission plans.

Based on the results of the simulation, at least one table, chart or graph is generated in step 808 which can be subsequently used to identify any conflicts in module behaviors as a result of implementing the mission plans. For example, the table, chart and/or graph may include, but is not limited to, information indicating (1) the false values of the first source IP address at all times during the first pre-defined period of time and (2) the false values of the second source IP address at all times during the second pre-defined period of time.

Next in step 812, the contents of the table(s), chart(s) and/or graph(s) are compared to each other. Based on the results of this comparison, a decision is made in step 814 as to whether any conflict exists between module behaviors defined by the mission plans. For example, in some scenarios, a decision is made as to whether false values for the first and second source IP addresses are the same at any given time within the overlapping period of the first and second per-determined periods of time.

If a determination is made that a conflict does not exists between module behaviors defined by the mission plans [814:NO], then step 816 is performed where at least one of the mission plans is distributed and loaded. The manner in which the mission plans are distributed and loaded will be described in detail below.

If a determination is made that a conflict does exists between module behaviors defined by the mission plans [814:YES], then step 818 is performed where at least one of the mission plans is modified. Thereafter, step 820 is performed where process 800 is repeated using the modified mission plan(s) and/or the un-modified mission plan(s).

Distribution and Loading of Mission Plans

The distribution and loading of mission plans as disclosed herein will now be described in further detail. Referring once again to FIG. 1, it can be observed that the modules 105-107, 113, 114 are distributed throughout the computer network 100 at one or more locations. The modules are integrated within the communications pathways to intercept communications at such locations, perform the necessary manipulations, and forward data to other computing devices within the network. With the foregoing arrangement, any necessary maintenance of the modules described herein (e.g., maintenance to update a mission plan) will have the potential to disrupt network communications while the modules are replaced or reprogrammed. Such disruptions are undesirable in many situations where reliability and availability of network services is essential. For example, uninterrupted network operation can be essential for computer networks used by military, emergency services and businesses.

In order to ensure uninterrupted network operations, each module preferably has several operating states. These operating states include (1) an off state in which the module is powered down and does not process any packets, (2) an initialization state in which the module installs software scripts in accordance with the mission plan, (3) an active state in which data is processed in accordance with a current mission plan, and (4) a by-pass state in which packets can flow through the module as if the module was not present. The module is configured so that, when it is in the active state or the by-pass state, the module can receive and load an updated mission plan provided by a network administrator. The module operating states can be manually controlled by the network administrator by means of the NCSA executing, for example, on NAC 104. For example, the user can select operating states for various modules through the use of a graphical user interface control panel. Alternatively, the module operating states can be automatically controlled by the NCSA executing, for example on NAC 104. Commands for controlling the operating states of the network are communicated over the computer network 100, or can be communicated by any other suitable means. For example, a separate wired or wireless network (not shown) can be used for that purpose.

Figure 9:
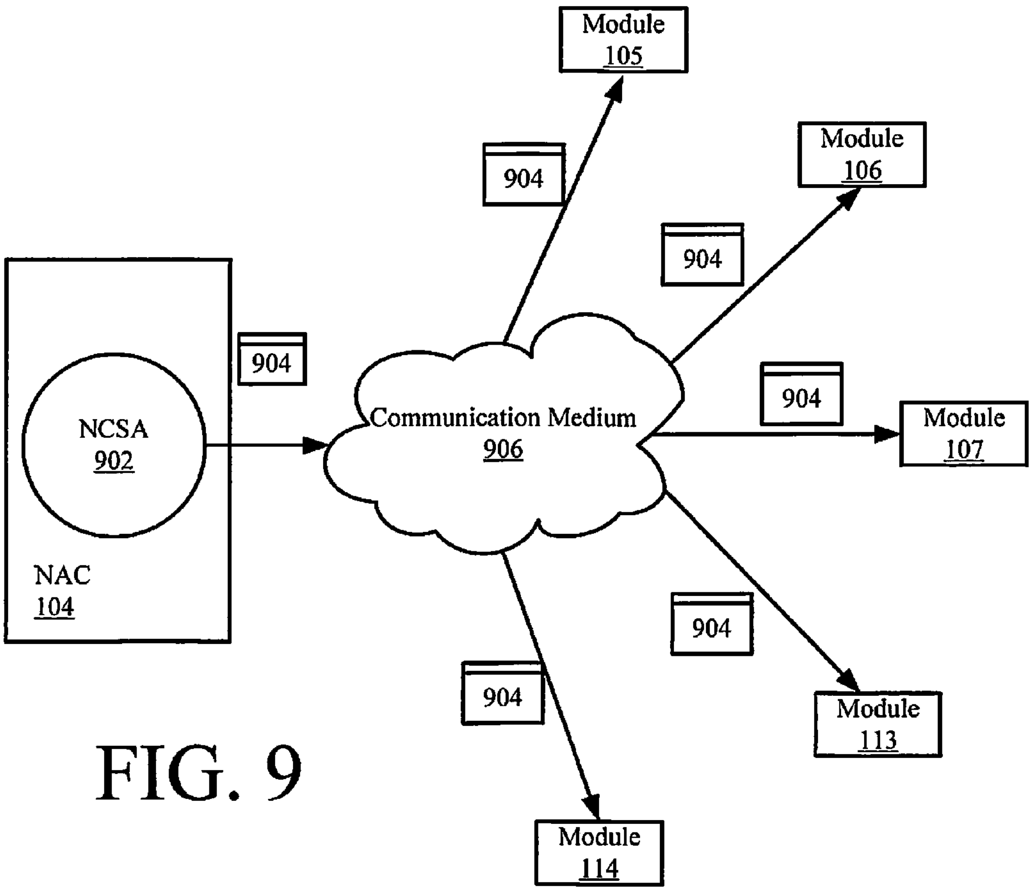
FIG. 9 is a diagram that is useful for understanding the way in which a mission plan can be communicated to a plurality of modules in the network in FIG. 1.

The mission plan can be loaded directly at the physical location of each module, or it can be communicated to the module from the NCSA. This concept is illustrated in FIG. 9, which shows mission plans 904 being communicated from NCSA 902 to each of the modules 105-107, 113, 114 over a communication medium 906. In the example shown, the NCSA software application is executing on NAC 104. The communication medium can in some embodiments include in-band signaling using computer network 100. Alternatively, an out-of-band network (e.g., a separate wireless network) can be used as the communication medium 906 to communicate the updated mission plan from the NCSA to each module.

Figure 10:
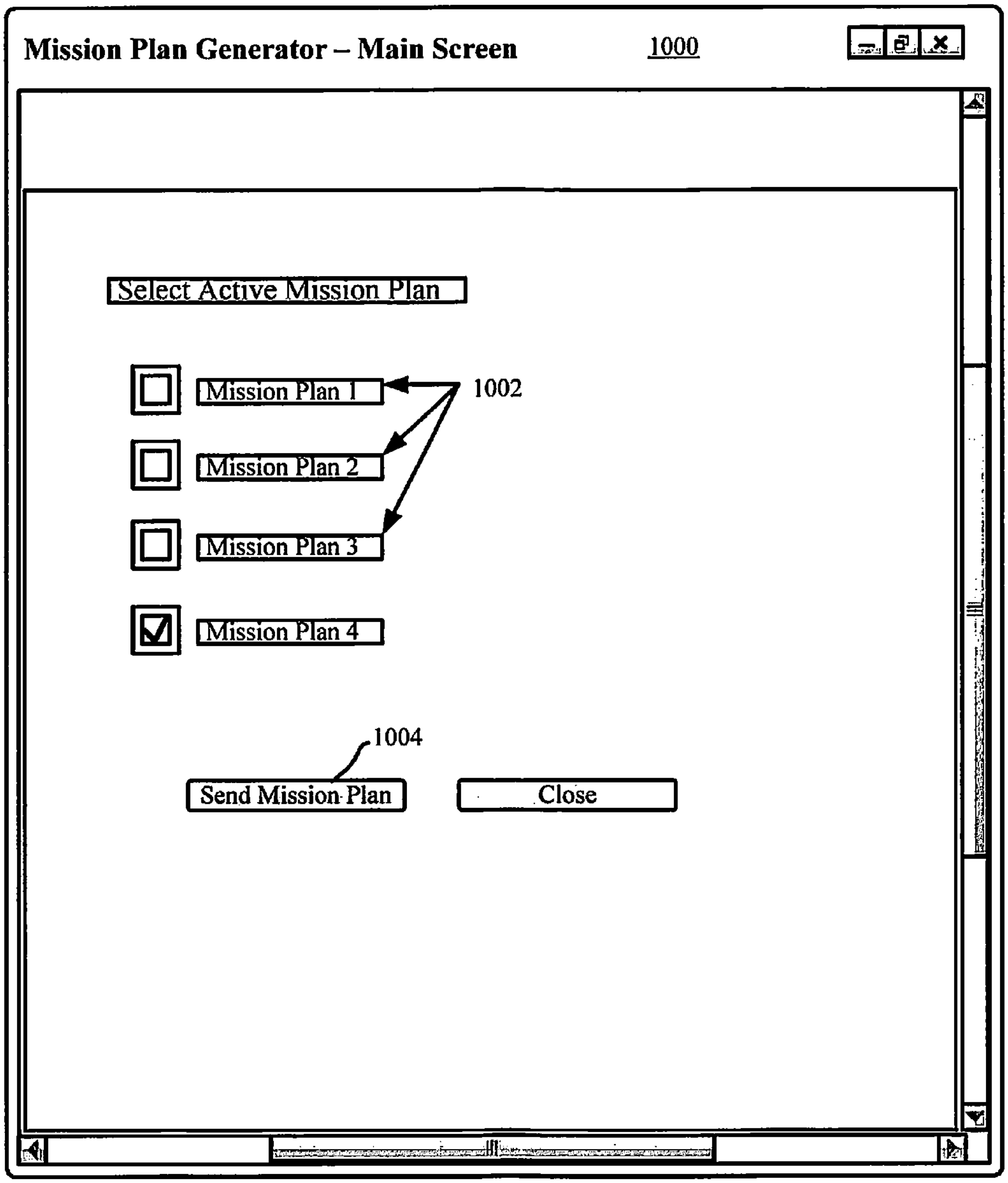
FIG. 10 is a schematic illustration of an exemplary GUI that can be used to select a mission plan from a plurality of mission plans and communicate the selected mission plan to the modules as shown in FIG. 9.

In scenarios where the NAC is being controlled by a network administrator, the NCSA can provide a GUI 1000 to facilitate selection of one of several mission plans 1002, as shown by FIG. 10. Each of these mission plans 1002 can be stored on NAC 104. The network administrator can select from one of the several mission plans 1002, after which they can activate a “Send Mission Plan” button 1004. Alternatively, a plurality of mission plans can be communicated to each module and stored there. In either scenario, the user can choose one of the defined mission plans to activate.

In scenarios where network maneuverability is automatically controlled, the NCSA selects at least one mission plan from a plurality of mission plans based on the results of a conflict analysis such as that described above. After which, the NCSA generates a command to send the mission plan(s).

In response to the command to send the mission plan, the selected mission plan is communicated to the modules while they are in an active state in which they are configured for actively performing dynamic modification of IDPs as described herein. Such an arrangement minimizes the time during which the network operates in the clear and without manipulating IDPs. However, the updated mission plan can also be communicated to the modules while they are in the by-pass mode, and this approach may be desirable in certain cases.

Once the mission plan is received by a module, it is automatically stored in a memory location within the module. Thereafter, the module can be caused to enter the by-pass state and, while still in that state, the module can load the data associated with the new mission plan. This process of entering into the by-pass state and loading the new mission plan data can occur automatically in response to receipt of the mission plan, or can occur in response to a command from the NCSA software controlled by the network administrator. The new mission plan preferably includes changes in the way that IDP values are varied. Once the new mission plan has been loaded, the modules 105-107, 113, and 114 can be transitioned from the by-pass mode to the active mode in a synchronized way to ensure that data communication errors do not occur. The mission plan can specify a time when the modules are to return to the active mode, or the network administrator can use the NCSA to communicate a command to the various modules, directing them to enter into the active mode. The foregoing process of updating a mission plan advantageously allows changes in network security procedures to occur without disrupting communication among the various computing devices attached to the computer network 100.

The dynamic manipulation of various IDPs at each module 105, 106, 107, 113, and 114 is preferably controlled by the application software executing on each module 105-107, 113, 114. However, the behavior of the application software is advantageously controlled by the mission plan.

Figure 11:
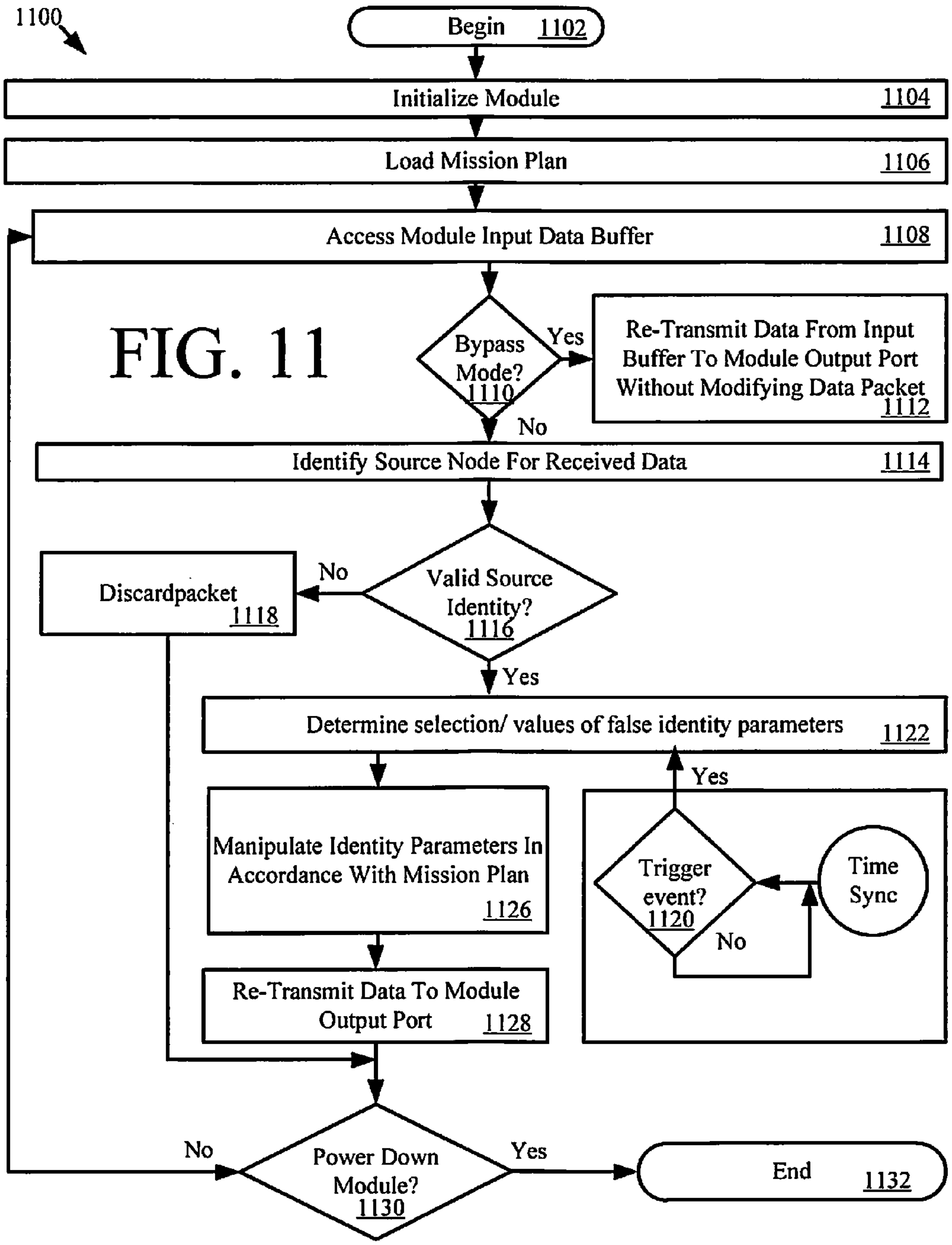
FIG. 11 is a flowchart that is useful for understanding the operation of a module in FIG. 1.

Referring now to FIG. 11, there is provided a flowchart which summarizes the operation of each module 105-107, 113, 114. To avoid confusion, the process 1100 is described with respect to communications in a single direction. For example, in the case of module 105, the single direction could involve data transmitted from client computer 101 to hub 108. In practice however, it is preferred that modules 105-107, 113, 114 operate bi-directionally. The process begins at step 1102 when the module is powered up and continues to step 1104 where module application software is initialized for executing the methods described herein. In step 1106, a mission plan is loaded from a memory location within the module. At this point, the module is ready to begin processing data and proceeds to do so at step 1108, where it accesses a data packet from an input data buffer of the module. In step 1110, the module checks to determine if it is in a bypass mode of operation. If so, the data packet accessed in step 1108 is retransmitted in step 1112 without any modification of the data packet. If the module is not in bypass mode, then it must be in its active mode of operation and continues on to step 1114. In step 1114, the module reads the data packet to determine the identity of a source node from which the data packet originated. In step 1116, it examines the packet to determine if the source node is valid. The specified source node can be compared to a list of valid nodes to determine if the specified source node is currently valid. If it is not a valid node then the packet is discarded in step 1118. In step 1120, the process checks to determine if a trigger event occurred. The occurrence of a trigger event will influence the selection of false identify values to use. Accordingly, in step 1122, the module determines the false identify values to use based on one or more of the trigger information, clock time and mission plan. The module then continues to step 1126 where it manipulates IDPs of the data packet. Once manipulations are complete, the data packet is re-transmitted to an adjacent node from the output port of the module. In step 1130, a determination is made as to whether the module has been commanded to power down. If so, the process ends at step 1132. In step 1108, the process continues and the next data packet is accessed from the module's input data buffer.

Enterprise Mission Management

Figure 12:
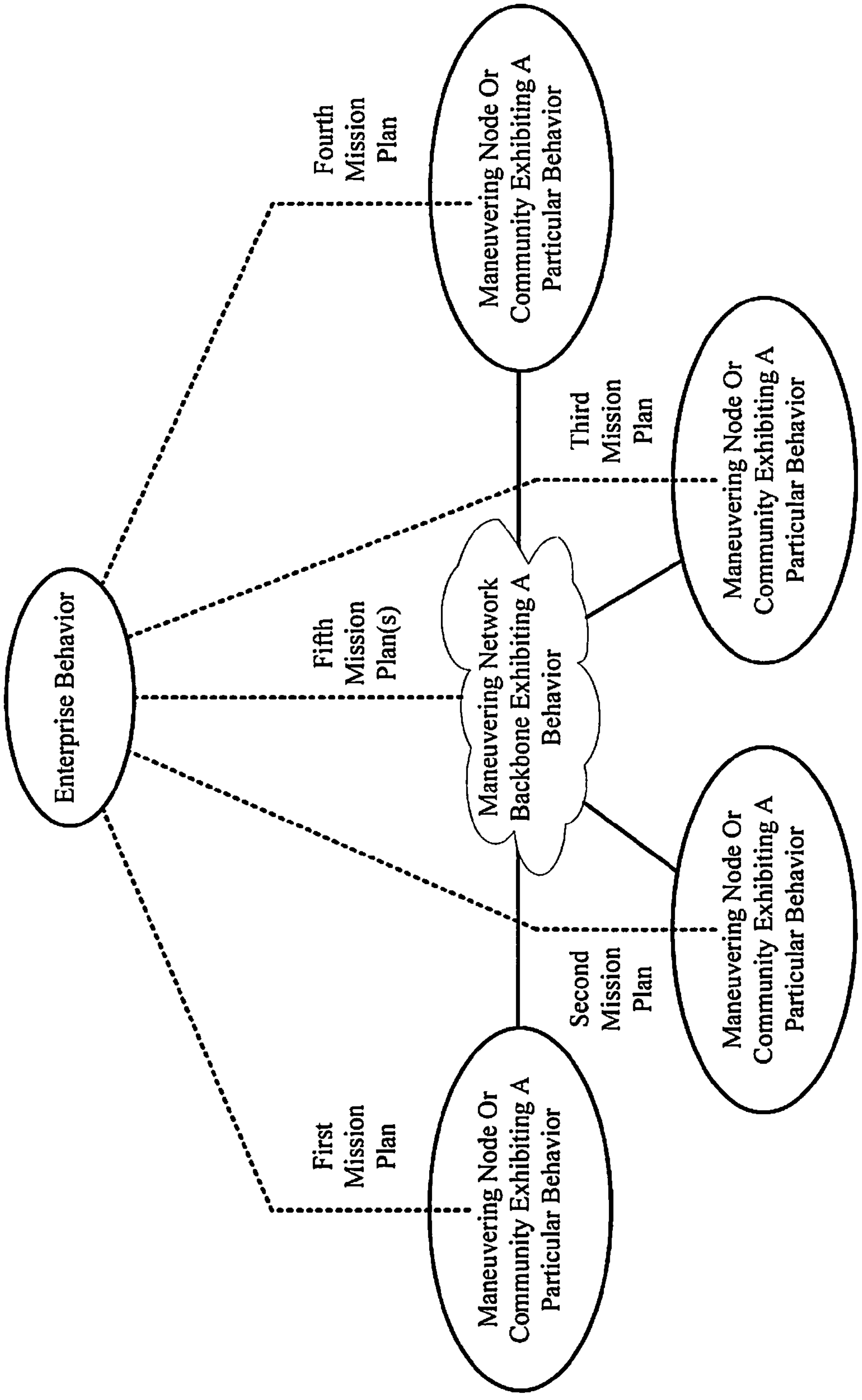
FIG. 12 is a schematic illustration that is useful for understanding an overall enterprise behavior of a computer network.
Figure 13:
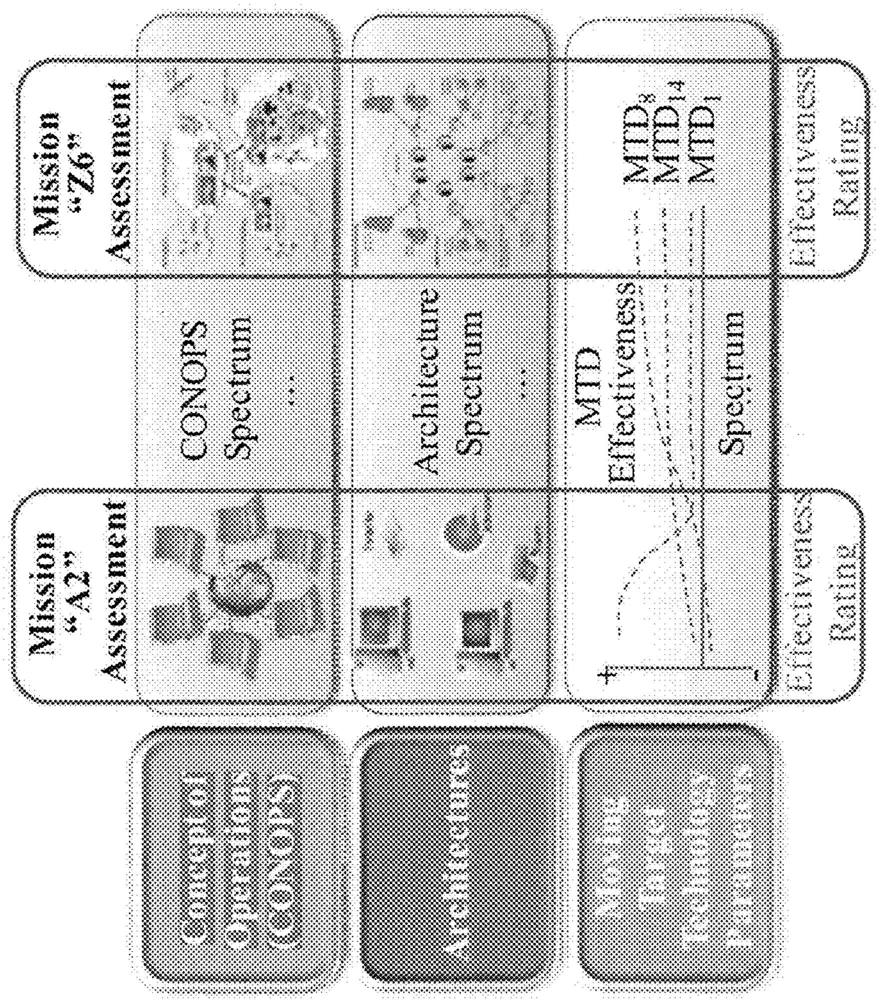
FIG. 13 is a schematic illustration that is useful for understanding enterprise mission management.

The overall behavior of a maneuvering computer network (e.g., computer network 100 of FIG. 1) is managed from an enterprise point of view such that the computer network operates in accordance with enterprise CONOPS, as well as mission CONOPS. In this regard, the overall behavior of the computer network is defined by the summation of the module behaviors as specified in the mission plans implemented within the computer network, as shown in FIG. 12. Accordingly, the NCSA manages the distribution and control of mission plans to endpoints or endpoint areas of the computer network based on an analysis of the relationships between various layers defining the overall enterprise objectives/rules/policies, as well as the computer network architecture. As shown in FIG. 13, the layers can include, but are not limited to, a CONOPS layer, a network architecture layer, and a moving target technology parameter layer.

In some scenarios, a graphical user interface is provided at the computer system being used by the network administrator. The graphical user interface is generally configured to present a schematic illustration of the current overall behavior of the computer network. The content of the schematic illustration dynamically changes as the behavior of the computer network changes. For example, when a new mission plan is employed or an old mission becomes inactive, the schematic illustration is modified to reflect this change. The graphical user interface also allows a user to see operations being performed by each node or select nodes of the network in real time or substantially real time. The graphical user interface may include widgets to allow a user to selectively modify behavior of the overall network or at least one node of the network.

Figure 14A:
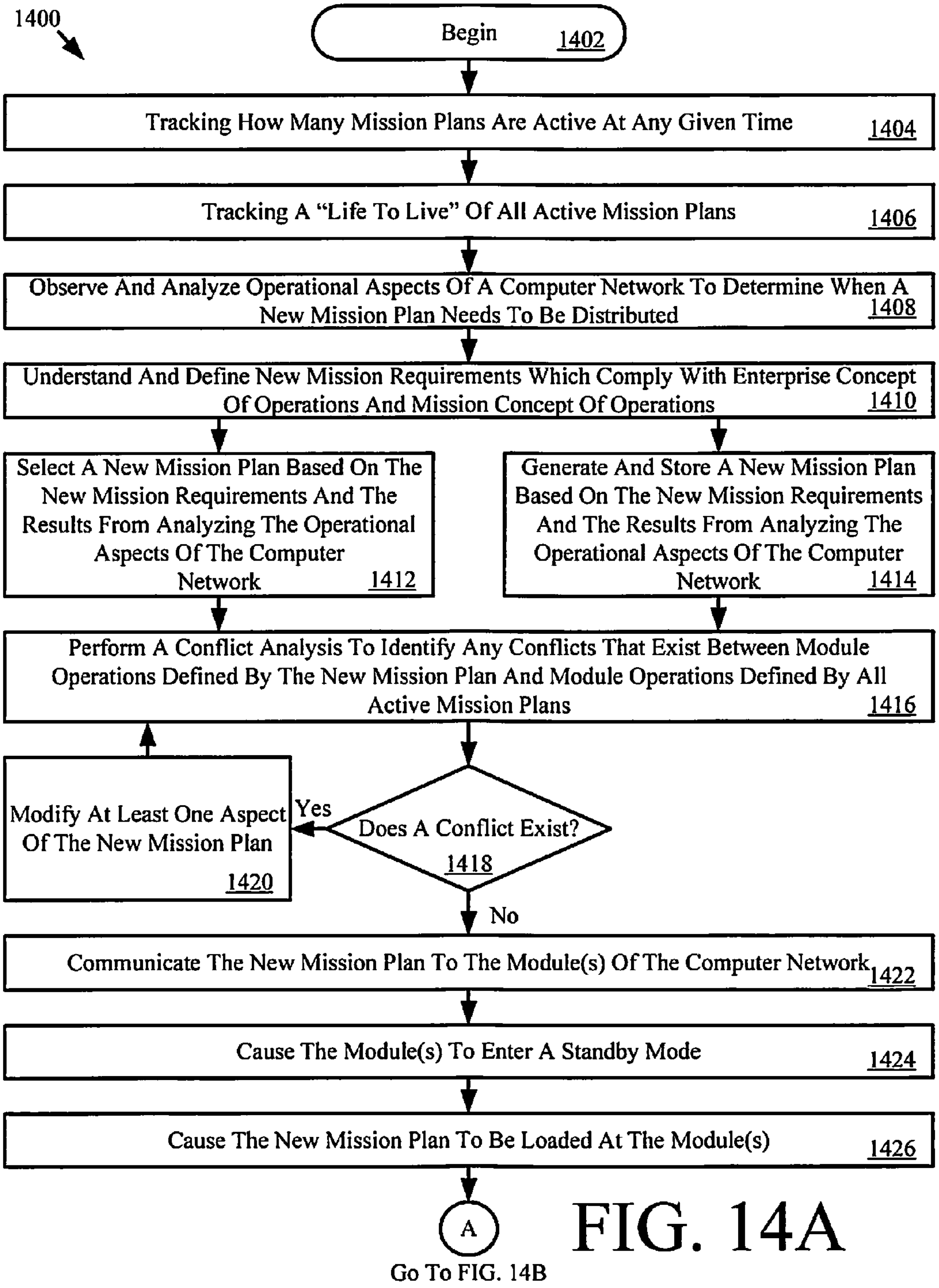
FIGS. 14A and 14B collectively provide a flow diagram of an exemplary method for enterprise mission management of a dynamic computer network.
Figure 14B:
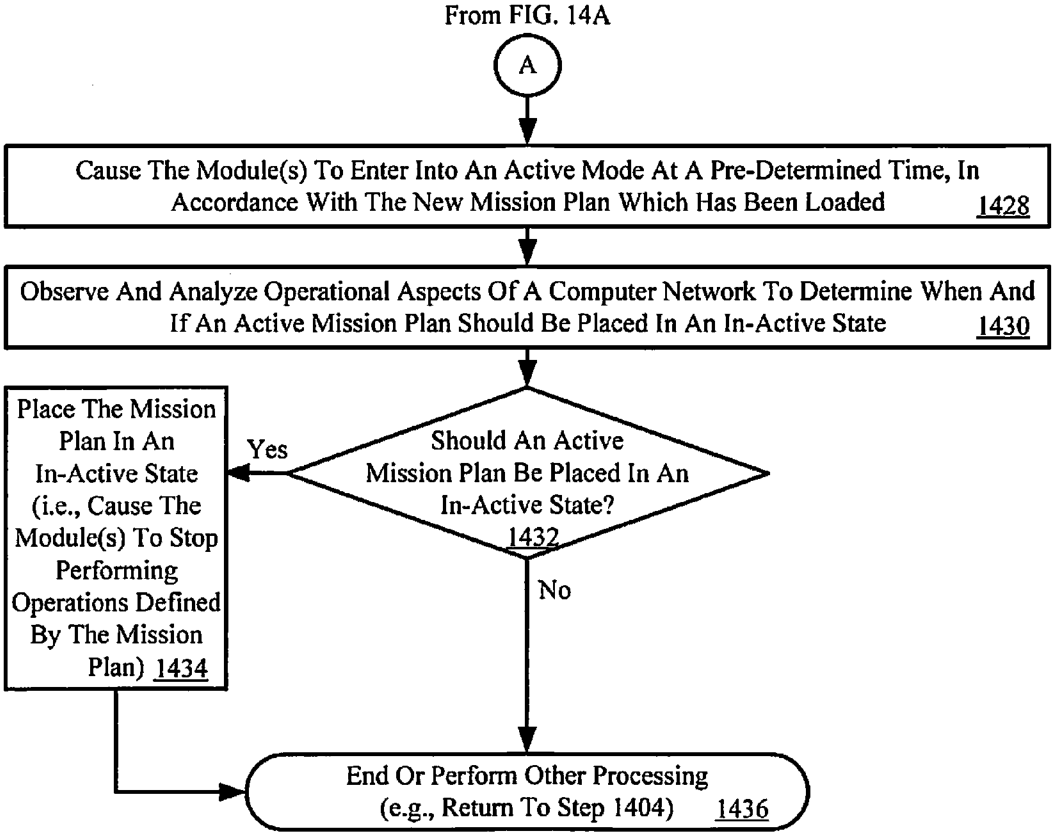

Referring now to FIGS. 14A-B, there is provided a flow diagram of an exemplary method 1400 for enterprise mission management of a dynamic computer network. As shown in FIG. 14A, method 1400 begins with step 1402 and continues to steps 1404-1406, where tracking operations are performed by the NCSA. The tracking operations involve: tracking the number of mission plans that are active at any given time; and tracking a "life to live" of all active mission plans.

Next in step 1408, the NCSA performs operations to observe and analyze aspects of a computer network (e.g., computer network 100 of FIG. 1). These operations are performed for determining when a new mission plan needs to be distributed. Accordingly, these operations can include, but are not limited to, one or more of the following operations: packet inspection operations; congestion level based operations; network state based operations; user activity based operations; and network attack based operations.

In some scenarios, the packet inspection operations involve: analyzing a packet to obtain information identifying an origin of the packet, a destination of the packet, a group to which the origin or destination belongs, and/or a type of payload contained in the packet; analyzing a packet to determine whether a code word is contained therein; comparing the information obtained from the packet with information stored in a data store to determine if a match exists; and/or determining whether a trigger event has occurred for distributing a new mission plan, based on the results of the comparing.

In some scenarios, the congesting level based operations involve: monitoring the level of congestion within the computer network; tracking the level of congestion within the computer network; and/or comparing a current level of congestion with a threshold value to determine if a trigger event has occurred for distributing a new mission plan.

In some scenarios, the network state based operations involve: monitoring a state of the computer network; tracking the state of the computer network; analyzing the computer network to determine a state thereof; and determining if a trigger event has occurred for distributing a new mission plan based on the results of the analysis.

In some scenarios, the user activity based operations involve: monitoring user activities within the computer network; collecting information about the user activities; analyzing the collected information to determine if a certain protocol pattern exists; and determining if a trigger event has occurred for distributing a new mission plan based on the results of the analysis.

In some scenarios, the network attack based operations involve: monitoring attack events within the computer network; tracking attack events within the computer network; performing LUT operations to determine a level of an attack and/or the type of attack on the computer network; and determining if a trigger event has occurred for distributing a new mission plan based on the results of the LUT operations.

Referring again to FIG. 14A, method 1400 continues with step 1410 where the NCSA performs operations to understand and define new mission requirements which comply with enterprise and mission CONOPS. In this regard, the NCSA determines the module(s) to which the new mission plan(s) should be distributed. Subsequently, step 1412 or 1414 is performed.

Step 1412 involves selecting a new mission plan from a plurality of pre-stored mission plans based on the new mission requirements and the results from analyzing the operations aspects of the computer network. For example, if a Level 1 attack is detected, then a first mission plan is selected. In contrast, if a Level 5 attack is detected, then a second different mission plan is selected.

Step 1414 involves generating and storing a new mission pan. The new mission plan can be generated manually by a network administration or automatically by the NCSA, as described above. In all scenarios, the new mission plan can be generated based on the new mission requirements and the results from analyzing the operational aspects of the computer network. For example, a timing scheme, a pseudorandom function and/or a chaotic function for a mission plan can be selected at least partially based on the type of trigger event detected in step 1408, the content contained in a packet, the current congestion level of the computer network, the current state of the computer network, the type of user activity within the computer network, the level of an attack detected on the computer network, and/or the type of attack detected on the computer network.

Once the new mission plan has been selected or generated, step 1416 is performed by the NCSA. In step 1416, the NCSA performs a conflict analysis, such as that described above, to identify any conflicts that exist between module operations defined by the new mission plan and module operations defined by all active mission plans. If the NCSA determines that a conflict does exist [1418:YES], then the new mission plan is modified as shown by step 1420. Thereafter, the conflict analysis is performed using the modified mission plan. If the NCSA determines that a conflict does not exist [1418:NO], then step 1422 is performed where the new mission plan is communicated to the module(s) of the computer network, where the mission plan is stored in a memory location.

When the network administrator and/or the NCSA is ready to implement the new mission plan, a command is sent in step 1424 which causes the module(s) to enter a standby mode as described herein. While the module(s) is(are) in this standby mode, the mission plan is loaded at step 1426. Loading of the mission plan occurs at the module(s) so that the mission plan can be used to control the operations of an application software executing on the module(s). In particular, the mission plan is used to control the way in which the application software performs dynamic manipulations of IDPs. Upon completing step 1426, method 1400 continues with step 1428 of FIG. 14B.

In step 1428, the module(s) is(are) again caused to enter into an active operational mode in which the module(s) perform(s) manipulations of IDPs in accordance with the mission plan. Steps 1424, 1426 and 1428 can occur in response to specific commands sent from a network administrator, or can occur automatically at the module(s) in response to receiving the mission plan in step 1422.

After step 1428, the module(s) continue(s) performing processing in accordance with the mission plan which has been loaded. In step 1430, method 400 continues by observing and analyzing operational aspects of the computer network to determine when and if an active mission plan should be placed in an in-active state. For example, if the network administrator and/or NCSA determines or suspects that an adversary has discovered an active mission plan for the computer network, then it may be desirable to change the mission plan so as to maintain the security of the computer network.

If the NCSA determines that none of the active mission plans should be placed in an in-active state [1432:NO], step 1436 is performed, which will be described below. In contrast, if the NCSA determines that an active mission plan should be placed in an in-active state [1432:YES], step 1434 is performed where the mission plan is placed in an in-active state (i.e., cause the module(s) to stop performing operations defined by the mission plan). Thereafter, step 1436 is performed where method 1400 ends or other processing is performed (e.g., method 1400 returns to step 1404). The other processing can involve re-configuring the computer network to operate in accordance with another mission plan which is intended to maintain the security of the computer network.

Figure 15:
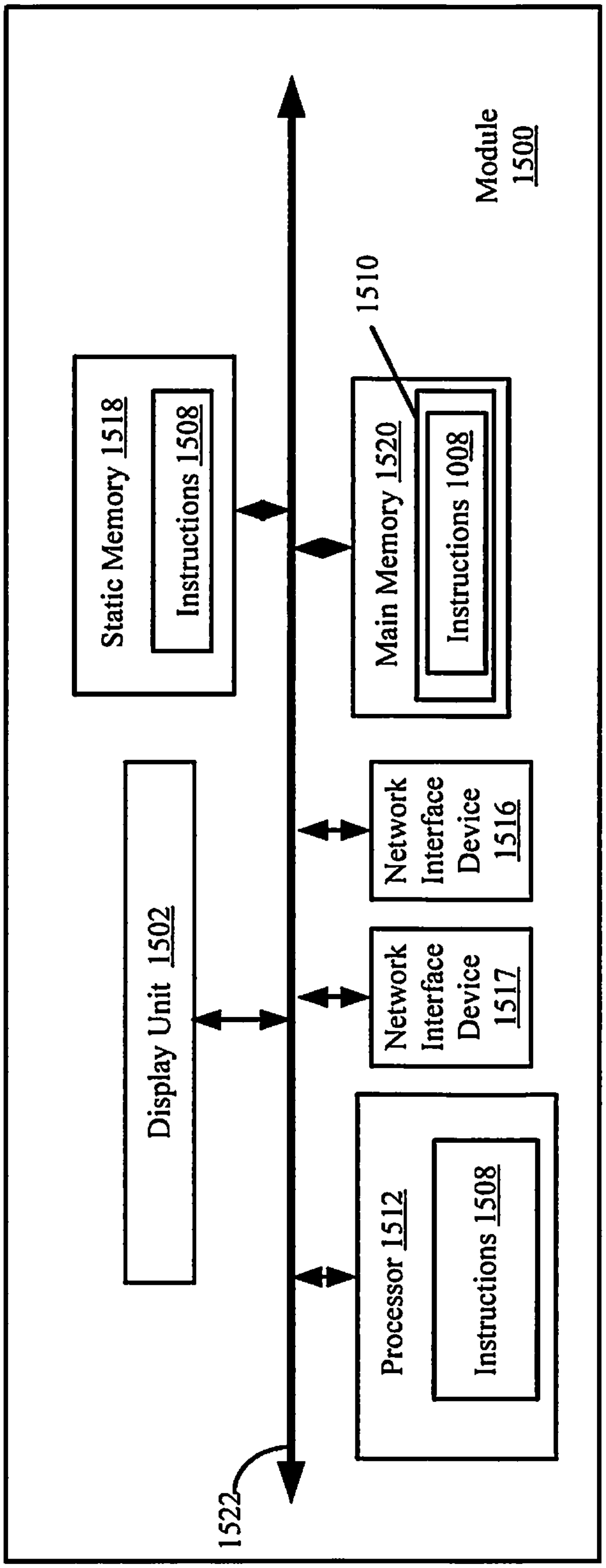
FIG. 15 is a block diagram of a computer architecture that can be used to implement the modules in FIG. 1.

Referring now to FIG. 15, there is provided a block diagram which shows a computer architecture of an exemplary module 1500 which can be used for performing the manipulation of IDPs described herein. The module 1500 includes a processor 1512 (such as a Central Processing Unit ("CPU")), a main memory 1520 and a static memory 1518, which communicate with each other via a bus 1522. The module 1500 can further include a display unit 1502, such as a Liquid Crystal Display ("LCD") to indicate the status of the module. The module 1500 can also include one or more network interface devices 1516, 1517 which allow the module to receive and transmit data concurrently on two separate data lines. The two network interface ports facilitate the arrangement shown in FIG. 1, where each module is configured to concurrently intercept and re-transmit data packets received from two separate computing devices on the network.

The main memory 1520 includes a computer-readable storage medium 1510 on which is stored one or more sets of instructions 1508 (e.g., software code) configured to implement one or more of the methodologies, procedures, or functions described herein. The instructions 1508 can also reside, completely or at least partially, within the static memory 1518, and/or within the processor 1512 during execution thereof by the module. The static memory 1518 and the processor 1512 also can constitute machine-readable media. In the various embodiments of the present invention, a network interface device 1516 connected to a network environment communicates over the network using the instructions 1508.

Figure 16:
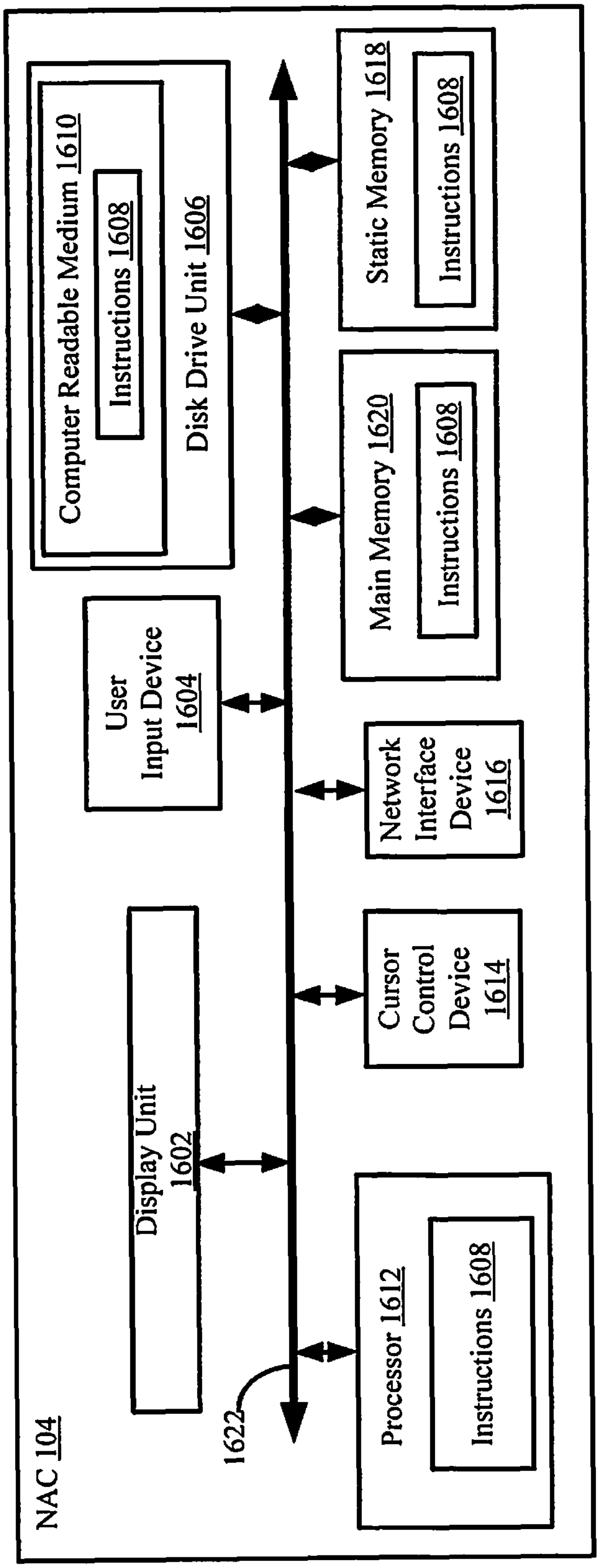
FIG. 16 is a block diagram of a computer architecture that can be used to implement a Network Administration Computer ("NAC") shown in FIG. 1.

Referring now to FIG. 16, there is shown an exemplary NAC 104 in accordance with the inventive arrangements. The NAC 104 can comprise various types of computing systems and devices, including a server computer, a client user computer, a Personal Computer ("PC"), a tablet PC, a laptop computer, a desktop computer, a control system or any other device capable of executing a set of instructions (sequential or otherwise) that specifies actions to be taken by that device. Further, while a single computer is illustrated in FIG. 16, the phrase "NAC" shall be understood to include any collection of computing devices that individually or jointly execute a set (or multiple sets) of instructions to perform any one or more of the methodologies discussed herein.

Referring now to FIG. 16, the NAC 104 includes a processor 1612 (such as a CPU), a disk drive unit 1606, a main memory 1620 and a static memory 1618, which communicate with each other via a bus 1622. The NAC 104 can further include a display unit 1602, such as a video display (e.g., an LCD), a flat panel, a solid state display, or a Cathode Ray Tube ("CRT"). The NAC 104 can include a user input device 1604 (e.g., a keyboard), a cursor control device 1614 (e.g., a mouse) and a network interface device 1616.

The disk drive unit 1606 includes a computer-readable storage medium 1610 on which is stored one or more sets of instructions 1608 (e.g., software code) configured to implement one or more of the methodologies, procedures, or functions described herein. The instructions 1608 can also reside, completely or at least partially, within the main memory 1620, the static memory 1618, and/or within the processor 1612 during execution thereof. The main memory 1620 and the processor 1612 also can constitute machine-readable media.

Those skilled in the art will appreciate that the module architecture illustrated in FIG. 15 and the NAC architecture in FIG. 16, each represent merely one possible example of a computing device that can be used respectively for performing the methods described herein. However, the invention is not limited in this regard and any other suitable computing device architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

While the computer-readable storage medium 1510, 1610 is shown in FIGS. 15 and 16 to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but is not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Communications with Computing Devices Connected to a Different Logical Network

Before describing further aspects of the inventive arrangements, it is useful to consider the operation of conventional switches. Conventional switches connect multiple segments of a network together. The simplest devices that perform this function are called "hubs" and operate at the physical layer. Hubs do not perform any traffic management tasks on data packets but simply copy all data traffic entering at a port and broadcast it out all other ports. Layer 2 (or "network") switches operate up to the link layer and have the ability to inspect packets entering the switch and to direct each packet to the proper port based on the destination physical address of the link layer packet. Switches differ from hubs in that they can forward packets to their destination without broadcasting across every port. Multi-layer switches (e.g., Layer 3 switches) can operate up to the network, transport, and/or application layers and are able to perform operations that require knowledge of higher layer protocols such as IP multicasting, IP security, firewalling, load balancing, secure sockets layer encryption/decryption, and the like. Switches that operate at higher layers can perform some or all of the functions of routers and bridges. Conversely, routers and bridges can also perform lower layer switching functions.

Switches forward packets to the next hop by associating each output port with a particular physical address. As mentioned above, switches operate primarily in the data link layer. Data link layer messages (i.e., data packets) are addressed to physical addresses that represent the "next hop" in the data packet's path. An example of a physical address is the MAC address for the network interface of the host machine. MAC addresses are resolved using a link layer protocol such as Address Resolution Protocol ("ARP") and this information is then stored in a table for quick reference (e.g., an ARP table). When a packet is received that is destined for a particular host, the switch looks up the destination MAC address on the ARP table, locates the port associated with that MAC address and forwards the packet. If the MAC address for the destination host is not listed in the ARP table, the switch can broadcast an ARP polling message on every output port. If the destination host is connected to the switch, it will answer with an acknowledgement and the switch will forward the packet to the host using the port that received the acknowledgement. The switch can also record the port and network address in the ARP table for future forwarding to that MAC address.

Multi-layer switches that operate in the network layer or above can use logical addresses (e.g., IP addresses) to forward packets to their destination. Although network layer functions and above layer functions are typically handled by routers, there is little functional difference between a conventional router and a layer 3 (or network layer) switch. In either case, the switch (or router) receives a data packet destined for a particular host that has a logical address (i.e., a network layer or protocol address). After receiving the packet, the network layer switch will compare the destination IP address of the packet to a routing table to determine both the logical and physical address of the next hop in the path to the destination host. The network layer switch then transmits the packet to the next hop. The primary difference between the packet received at a Layer 3 switch as compared to a packet received by a Layer 2 switch is that the destination address (e.g., a MAC address) of the link layer packet received at the Layer 3 switch is that of the switch itself. As explained above, a link layer packet is addressed to the next hop of the packet's path. The Layer 3 switch (or router) that receives the packet is the next hop of that packet and is tasked with determining the next hop for the packet based on the network layer address (e.g., an IP address) or other information contained in the packet. In contrast, a Layer 2 switch that receives a packet reads the link layer destination address and forwards the packet to the next hop, but the Layer 2 switch itself is not a destination.

A Moving Target Technology ("MTT") switch is able to perform packet forwarding as described above for an MTT enabled network operating in accordance with at least one mission plan at any given time. An MTT switch is able to perform the native functionality of a switch, described above, for MTT enabled traffic. In some embodiments, the MTT switch can also be arranged to automatically distinguish between MTT enabled traffic and conventional data traffic for purposes of determining how to properly perform such switching operations. The mission plan defines a set of transformations that are performed on IDPs of the data traffic within an MTT enabled network and the locations where such transformations are performed within the network. As with the modules, MTT enabled switches can be loaded with one or more mission plans. Additionally, MTT switches can perform the functions of modules and transform the IDPs of data packets in accordance with the mission plan.

Current switch technology forwards data by "locking" a particular physical address to a particular port on the switch in the ARP table, as described above. Consequently, conventional switches are unable to process MTT enabled traffic because the IDPs would move in accordance with the mission plan. For example, the IP address of the source and/or destination host, MAC address of the source and/or destination host, or both may be dynamically modified prior to reaching the switch. MTT enabled switches have the ability to operate according to the mission plan and correctly forward switched data packets with moving identities. For example, when a packet arrives at an MTT switch, the IDPs of the data packet are analyzed and the destination host is compared to a dynamic ARP table that is driven and modified by the mission plan.

The dynamic ARP table is populated and/or modified by the mission plan. The mission plan has information concerning manipulation of IDPs throughout the entire network and therefore can supply the switch with a fully populated ARP table for use in forwarding packets. This dynamic modification of the ARP table can occur in a number of ways. In certain embodiments, the values in the ARP table are populated by the mission plan when it is loaded into the switch. In such scenarios, the ARP table values are rewritten each time a new mission plan is activated. In other words, the values in the ARP table are changed to facilitate correct switching of packets using the IDPs as currently manipulated for use in the network according to the mission plan. In other embodiments, the relationships between the values in the ARP table are updated by the mission plan. For example, the relationships between ports and the various device addresses can be updated by the mission plan. In each scenario, the mission plan updates or modifies the ARP table so that the switch functions correctly with the manipulated IDPs in use at that particular time. As described above, the manipulation of IDPs can change based on a reactive trigger event. The mission plan will define what changes occur in response to a particular type of reactive trigger event. Therefore, each reactive trigger event can cause a modification or update to a dynamic ARP table.

In some scenarios, a switch includes dedicated ports that service both a static and an MTT enabled network. In effect, the switch is split with static ports servicing a static network and MTT ports servicing a dynamic network. In such a scenario, each set of ports can have a separate ARP table or can share an ARP table that includes a static section and an MTT section. At least that portion of the ARP table servicing the MTT enabled ports is determined in accordance with a mission plan, and varies in response to predetermined reactive trigger events defined by the mission plan. In another embodiment, the switch can identify MTT enabled traffic and transform the IDPs of the data packets into static IDPs (i.e., true IDPs). After the IDPs have been transformed, the switch can process the data packets using conventional switching algorithms using a static ARP table. The switch can thereafter forward the packets containing the true IDPs, or can forward the packets with false IDPs. The false IDPs can be the same as those contained in the packet when received, or the switch can manipulate the IDPs to include a different set of false IDPs. The way the packets are processed in either case can be determined by a mission plan as described above.

In certain embodiments, both static and dynamic data traffic can be present in the network at the same time. Therefore, the capability to accommodate both static and dynamic traffic is important. For example, data can be either static or dynamic based on the value or importance of the data. A host computer operating in accordance with a particular mission plan can enable MTT for data transmitted with a particular application or to a particular server. In contrast, web browsing data or other low priority data can be sent without enabling MTT. Therefore, all network equipment, including switches, can simultaneously accommodate both static and dynamic traffic and is fully capable of handling transformations and forwarding of MTT enabled packets in addition to forwarding of static packets through the same network.

In certain embodiments, the switch can be connected to multiple networks operating different mission plans. Alternatively, one or more of the networks connected to the switch can be static (i.e., not MTT enabled). In these situations, the switch can act like a bridge and be able to translate between networks operating different mission plans or between an MTT network and a static network. Switches operating between these network boundaries can have an ARP table for each network, or have an ARP table with multiple sections where each section corresponds to a different network. In either scenario, the ARP table can be dynamically populated in accordance with a mission plan.

In addition to forwarding MTT enabled data packets in accordance with a mission plan, MTT switches are also able to manipulate switching behavior based on the mission plan by pseudorandomly alternating the output port that is used for communicating packets to a particular destination. For example, a switch can have one port that leads to a router connected to another network in the same enterprise wide area network. The switch can have a second port that leads to a gateway into the Internet. Both paths can lead to the same destination and the switch can pseudorandomly alternate between the paths when communicating packets to the same ultimate destination. Alternatively, or in addition thereto, the switch can broadcast extraneous packets on some or all ports to create noise within the network. The extraneous packets can contain useless bits of random data in encrypted form to confuse and harass individuals and systems trying to infiltrate the network. The MTT switch can alternate between these behaviors or any combination thereof in accordance with one or more mission plans.

Optionally, the switch can further apply a set of filtering rules to function as a firewall. In certain embodiments, the switch can identify MTT enabled traffic based on a mission plan and filters out all other traffic. In other embodiments, the switch can detect anomalies in the data traffic. The filtering rules can be designed so that the switch directs non-MTT enabled and/or anomalous packets to a "honey-pot" server that can mimic the behavior of network systems to lure attack traffic. By filtering non-MTT enabled and/or anomalous packets to the honeypot, especially those associated with attack traffic, a network administrator is able to prevent an attack, analyze network vulnerabilities, and/or develop new techniques for countering attacks based on the behavior of the disallowed traffic. Alternatively, the non-MTT enabled packets can be discarded out right, or filtered using conventional firewalling techniques.

Figure 17:
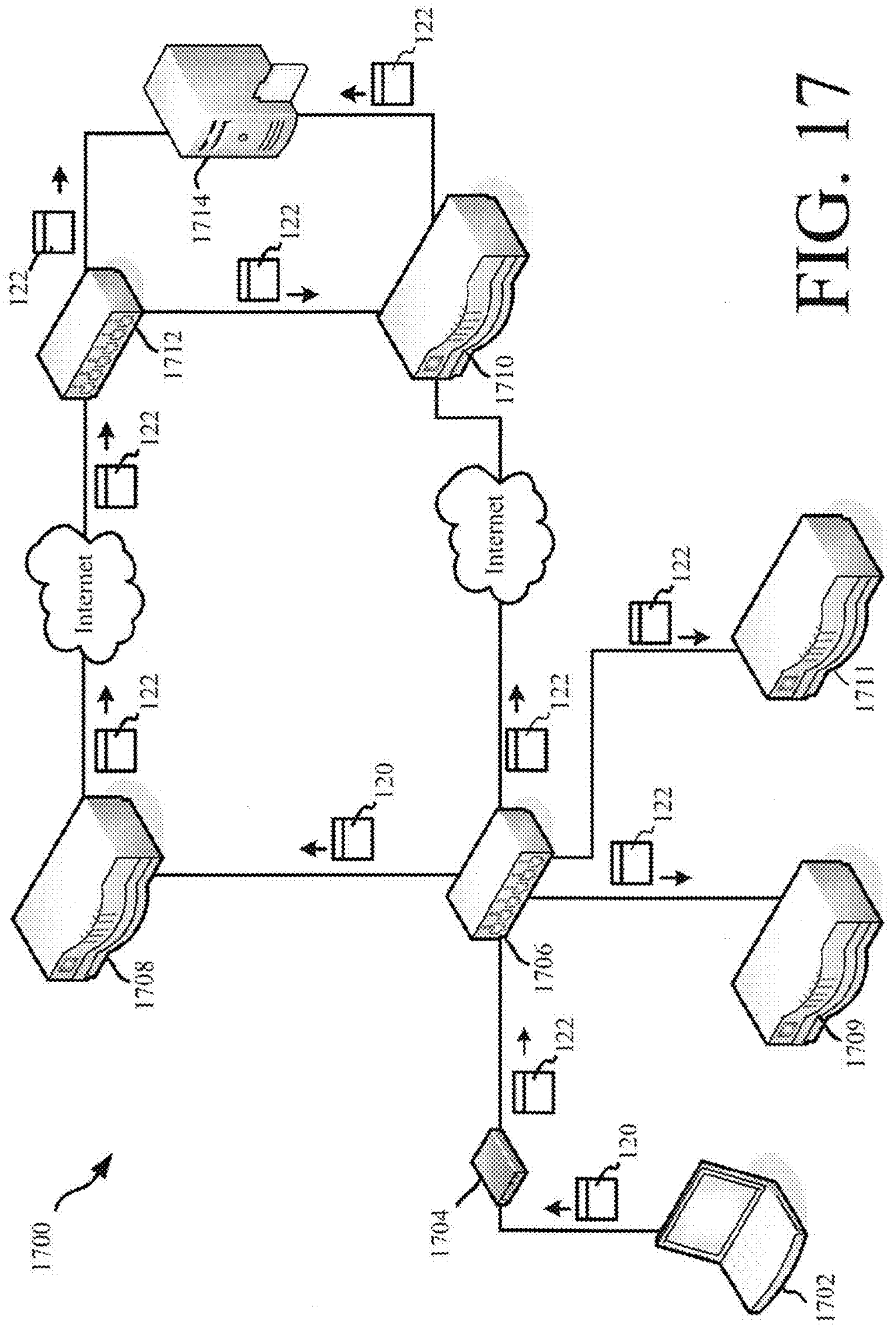
FIG. 17 is an example of a computer network that is useful for understanding the present invention.

To further understand this function of the MTT switches described herein, consider FIG. 17 and the following examples. Referring now to FIG. 17, an exemplary network 1700 is provided. The network includes host 1702, module 1704, switches 1706, 1712, routers 1708, 1710, and host 1714. As shown in FIG. 17, a data packet is sent with IDPs 120. In one exemplary embodiment, module 1704 can transform IDPs 120 into IDPs 122 as previously described. In alternative embodiments, module 1704 may be within host 1702 or switch 1706. Additionally, routers 1708, 1710, switch 1712, and host 1714 can also include a module. Although FIG. 17 illustrates data packets traveling in one direction, one of skill in the art will recognize that data traffic can flow in both directions using well known duplexing techniques.

In a first example, a network segment comprises three separate components connected in series: a PC 1702, an MTT module 1704, and an MTT switch 1706. The PC 1702 is the source host for a data stream that enters a dynamic network through the switch 1706. Connected between the PC 1702 and the switch 1706 is a module 1704 that is capable of performing pseudorandom transformations on the data stream transmitted by the PC 1702. When the data stream reaches the switch 1706, various IDPs 122 of the data packets within the stream appear to have been transformed in random ways by the module 1704. More particularly, some of the IDP values 120 are pseudo-randomly transformed to false values 122 in accordance with a mission plan. The MTT enabled switch 1706 operates in accordance with the same mission plan, and therefore remains able to properly forward packets in the data stream to the next interface. In an alternative configuration, the module 1704 need not be a separate component but may be embedded within a PC 1702, as discussed above.

In a second example, the module 1704 is embedded within the switch 1706 and the switch 1706 itself is able to transform data packet IDPs 120 according to the mission plan. In such a scenario, the switch can receive a data stream that is non-MTT enabled, i.e., the IDPs 120 of the data packets have not been transformed. The switch then modifies the IDPs to specify false IDPs 122 before they are forwarded out into the network. The transformation at the switch 1706 can occur at the input port or the output port. In other words, the IDPs 120 can be transformed either before or after the switch determines which port to forward the packets through.

In a third example, an MTT switch 1706 connects two networks that operate according to different mission plans, represented in FIG. 17 as the networks connected to routers 1708, 1710. For clarity and to avoid obscuring the invention, the networks attached to routers 1708, 1710 are not shown. Specifically, one of the networks (e.g., router 1708) is a static network that is not MTT enabled. Data traffic that is transmitted between the two networks must be translated by the switch 1706 before it can be forwarded to the other network. For example, the IDPs 122 of a data packet arriving at the switch from the MTT enabled network must be translated to specify static values 120. Conversely, the IDPs of a data packet arriving at the switch from the static network must be translated to specify the IDPs that are in accordance with the currently active mission plan.

In a fourth example, an MTT switch 1706 connects networks A (i.e., router 1709), B (i.e., router 1710), C (i.e., router 1711) and D (i.e., router 1708). Networks A, B and C are dynamic MTT enabled networks operating in accordance with one or more mission plans. Network D is a static network that is not MTT enabled. When data is received at the MTT switch 1706, it evaluates the packets to determine if they comprise MTT enabled data having false IDPs corresponding to a current status of network A, B, or C (i.e., corresponding to what is expected according to the current mission plan of networks A, B, or C). If so, the switch 1706 performs appropriate MTT processing using one or more mission plans to route the data to an appropriate destination network. This processing can involve transforming a set of false IDPs (e.g., if the packet was sourced from an MTT enabled network) to a set of true IDPs if the destination network is a static network (network D, router 1708, in this example). Alternatively, such processing can involve transforming a first set of false IDPs corresponding to an MTT enabled source network (e.g., network A, router 1709) to a second set of false IDPs corresponding to an MTT enabled destination network (e.g., network B, router 1710). The first and second sets of false IDPs can include different selections of IDPs which are made false and/or different false values for the same set of IDPs. Alternatively, if the switch 1706 determines that a received packet contains erroneous MTT data that does not correspond to the current state of any network, then the received packet can be discarded or sent to a "honeypot" as described above.

The exemplary configurations described above are not meant to be limiting. Further, the embodiments are not limited to the network topology illustrated in FIG. 17. As mentioned above, the function of a switch can be built in to other network devices (e.g., routers and bridges). Additionally, the functions of modules and firewalls can be incorporated into switches, routers, and/or bridges. Network components can be combined to arrive at a dynamic network system that fits any set of needs.

Figure 18:
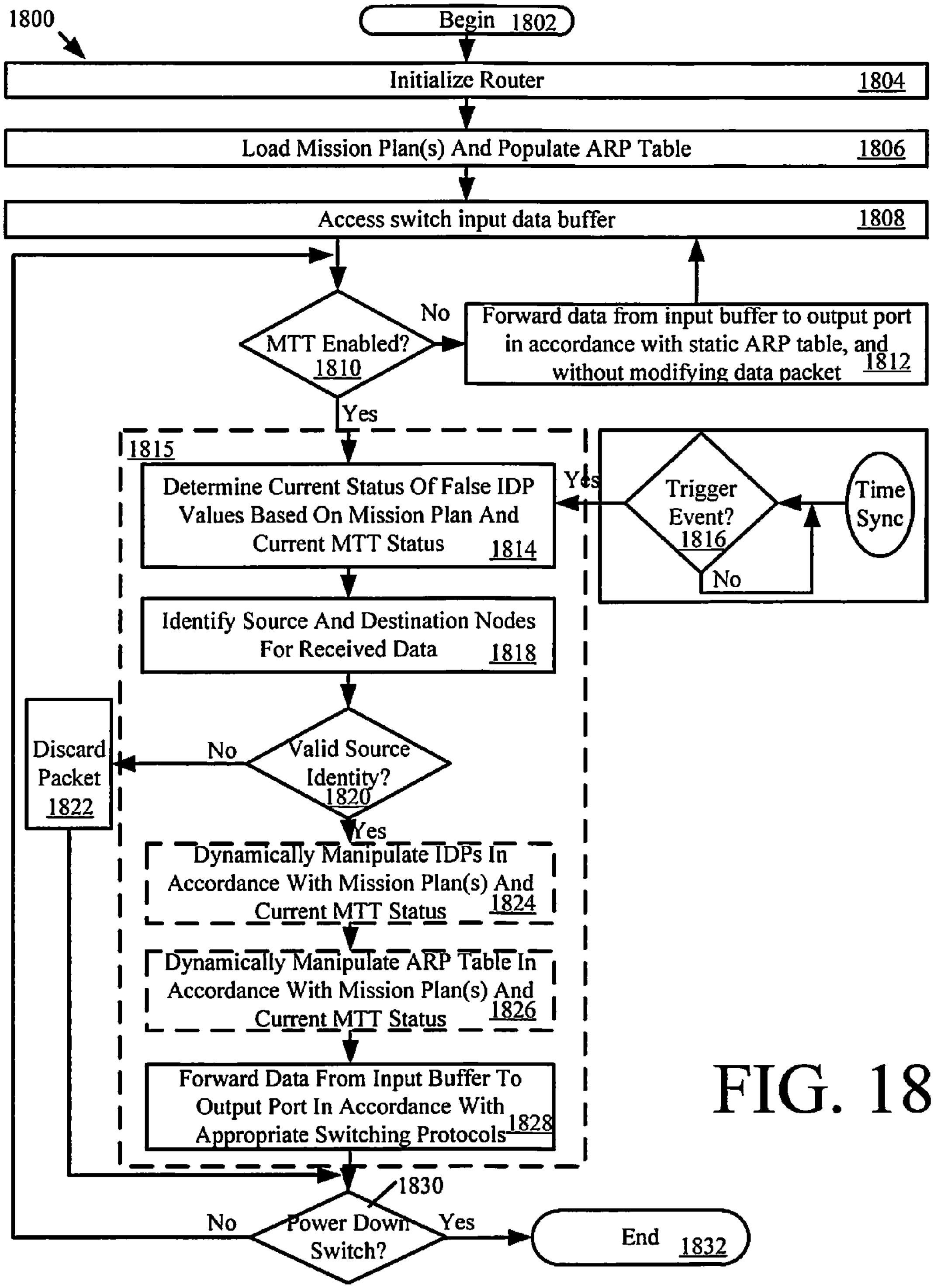
FIG. 18 is a flowchart that is useful for understanding the operation of a switch in FIG. 1.

Referring now to FIG. 18, a flowchart of process 1800 is provided to further illustrate the operation of an MTT switch. The process begins at step 1802 when the switch is powered up and continues to step 1804 where switch application software is initialized for executing the methods described herein. In step 1806, one or more mission plans are loaded from a memory location within the switch. The ARP table is also populated in accordance with the mission plan. A mission plan can define a dynamic maneuvering of a plurality of network segments within a single dynamic computer network. One or more mission plans can be loaded in a switch in a manner similar to that described above in relation to modules. In some scenarios, the mission plans are loaded into a memory of the switch and are activated, thereby producing a trigger event. The trigger event acts like a gate that distinguishes traffic received before the trigger event, which is processed using a previously active ARP table, and traffic received after the trigger event, which is processed using the newly activated ARP table. This can occur in a number of ways. In another embodiment, the mission plans may be loaded into memory when the switch is not active, or during a time when the MTT operations of the network are disabled. Once a mission plan has been loaded, the switch is ready to begin processing data and proceeds to do so at step 1808, where it accesses a data packet from an input data buffer of the switch.

In step 1810, the switch checks to determine if the MTT mode of operation has been enabled in the network. If not (1810: NO), the data packet accessed in step 1808 is directed in step 1812 to an output port using a static ARP table which is arranged to ensure proper forwarding of packets that contain true IDP values. In other words, this mode is used when the MTT mode of operation is not active and all IDPs are assumed to have their true values. The switch communicates the data packet to the appropriate output port in step 1812 without any modification of the data packet, in the same way that a conventional switch would. If the MTT mode is enabled (1810: YES), then the process continues on to step 1814.

The network will have some MTT status that defines how the IDPs in the network are currently being manipulated. In step 1814, the switch determines the current status of false IDP values based on the mission plan and the current MTT status. In step 1816, the system periodically checks to determine if a trigger event has occurred that would change the MTT status. This step of checking for the occurrence of a trigger event can be performed periodically as shown based on a clock signal, or it can be performed at any time during the process included within box 1815. This is an important step because the occurrence of a trigger event can have a significant effect upon the calculation of proper false identity values that are currently in use in the network. The information from step 1816, and any other appropriate information concerning the MTT status of the network, is then used to determine the current status of any MTT manipulations that are in use by the network at that time. For example, in step 1814 the occurrence of a trigger event can cause the system to generate an updated cross-reference, or LUT which includes any false IDP values which are in use at that time, and the corresponding true IDP values. The information concerning which IDPs are false, and the true values for such IDPs can be determined using a pseudorandom process as previously described. As shown in FIG. 18, the trigger event can occur during any of the processing steps 1814, 1818, 1820, 1824, 1826, and 1828 and will trigger an immediate re-determination of the current MTT status (e.g., current status of false IDP values) at that time.

Optionally, non-repudiation of the MTT IDPs can be enabled at step 1814. Non-repudiation is a security service that allows the network administrator to discover the MTT identities used by the dynamic network at any time. As a result, the true identities of the network sources and destinations are knowable notwithstanding the potentially pseudorandom nature of the IDPs of network traffic and cannot be "repudiated" to deny responsibility. In one embodiment, this may be achieved by simple logging of all false identities. Therefore, a logging function is performed whereby all false IDPs determined in step 1814 are recorded, for example, in memory. Alternatively, non-repudiation may be achieved through time-stamped recording of the pseudorandom function and the seed value associated with the current state of the MTT mission plan. This allows a network administrator to look backward at any time during the operation of the network to "reconstruct" the network identities from the pseudorandom function and the seed value used by the mission plan at that time.

In step 1818, the switch reads the data packet to determine the identity of a source node from which the data packet originated, and the destination node. The source and destination address information of the received data is important because it is needed to permit the switch to determine how to properly manipulate the IDPs contained within the data communication. In step 1820, the switch examines the data packet to determine if the source node is valid. This can be accomplished by comparing the source node specified in the data packet to a current list of valid source nodes which are currently in use (e.g., as determined in step 1814). If the source node information is not valid then the packet is discarded in step 1822. Steps 1824 and 1826 are optional steps which are discussed below in further detail.

The process continues on to step 1828 at which point the switch directs the packet to the appropriate output port. This step preferably includes appropriate actions to ensure proper forwarding of packets that contain false IDPs. More particularly, this step ensures that the next destination for the data communication is a correct path for the data communication in accordance with true information corresponding to the false IDPs, and in accordance with the mission plan. Recall that the information in the false IDP will be inconsistent with true IDP values, so appropriate adjustments must be made to accommodate the false information, while still ensuring proper forwarding of data messages. There are at least two possible methods to address this problem. In some embodiments, step 1828 can involve a cross-referencing process by which true IDP values are determined for any false IDPs contained in a packet. For example, the LUT generated in step 1814 can be used for this purpose. Once the true values are determined for such IDPs, the switch can use a static ARP table (i.e., the same table used in step 1812) to determine the correct output port for a particular packet. Thereafter, the packet can be directed to the correct output port. Alternatively, a dynamic ARP table can be generated for use in step 1828. The dynamic ARP table can directly specify a correct output port corresponding to false IDP information contained in a data packet. Other methods are also possible and the invention is not intended to be limited to the two approaches described here.

In step 1830, a determination is made as to whether the switch has been commanded to power down. If so, the process ends at step 1832; otherwise, the process returns to 1808. In step 1808 the process continues and the next data packet is accessed from the switch's input data buffer.

In the process described above, the switch performs forwarding operations which ensure that data packets containing false IDPs are nevertheless communicated to their proper destination node or nodes. In addition to performing such basic forwarding functions, the switch can also be configured to perform dynamic manipulations of IDPs in a manner similar to that described above with respect to the modules. Referring again to FIG. 18, optional step 1824 can comprise dynamic manipulation of IDPs in accordance with a mission plan and a current dynamic network status. The operations at step 1824 would be similar to IDP manipulations performed by modules 105-107, 113, 114 of FIG. 1 as described above. Upon completion of such manipulation of the IDPs, the process would continue essentially as described above in relation to step 1828. Forwarding operations would be performed using the current IDP values as manipulated by the switch. Notably, the manipulation operations in step 1824 can be selectively toggled on and off in accordance with a mission plan. This process is similar to the bypass mode described above in relation to the modules, and can facilitate varying a location within a network where IDP manipulation is performed. This bypass mode of operation can be implemented in steps 1810 and 1812 as described above. Alternatively, step 1824 can be bypassed individually.

In the process as described thus far, IDPs have been manipulated, but the forwarding protocol has been static. In other words, the rules for forwarding of packets have remained the same over time and these rules have not been affected by changes in the MTT status of the network. Packets are always routed along the same path or paths as they would be forwarded in a default forwarding scenario having a static ARP table. In addition to these static routing methods, the inventive arrangements can include dynamic forwarding.

In order to more fully understand the concept of dynamic forwarding, it is useful to consider an example. In the default forwarding scenario described above in reference to FIG. 18, switch 1706 directs a packet destined for server 1714 to router 1710 (via the Internet or some other public network) because this path has the shortest number of hops. However, in a dynamic forwarding embodiment of the invention, the forwarding protocol of each switch and/or router can be dynamically modified so that the way that a packet is forwarded by a particular switch/router will change over time (and under different conditions). Such variations in forwarding will not be predictable without access to information specified in the mission plan. Accordingly, a mission plan can specify, for example, that sometimes the packet destined for server 1714 be directed to router 1708 instead of directly to router 1710. The packet is then directed through the Internet (or any other public network) to switch 1712 and to the final destination (e.g., server 1714). At other times, a packet destined for the same server can have a different path. In such embodiments involving dynamic forwarding, the path the packet takes through network 1700 can be said to be dynamically altered in a pseudorandom way to thwart adversaries attempting to monitor network communications. The dynamic forwarding methods hereinafter described can be performed using any suitable technique and all such techniques are intended to be included in the scope of the present invention. Also, the dynamic modification of forwarding protocols can be performed alone, or in conjunction with the dynamic modification of IDPs as described above.

It should be understood that dynamic routing methods described herein are not limited to the process described above. In another embodiment, a switch operating in accordance with a mission plan can determine multiple viable paths through the network. The switch can segment and scatter communications across the viable paths in accordance with a pseudorandom algorithm defined by the mission plan. For example, with reference to FIG. 17, a switch 1706 can receive a communication which is segmented into two packets. Operating in accordance with the mission plan, switch 1706 can send one packet through router 1708 and the other packet directly to router 1710. The communication is then reassembled at the destination (e.g., server 1714). In such an embodiment, the switch 1706 can vary the path data packets will travel according to a pseudorandom function. One skilled in the art will recognize that this technique may be scaled to networks that include any number of switches and/or routers.

Figure 19:
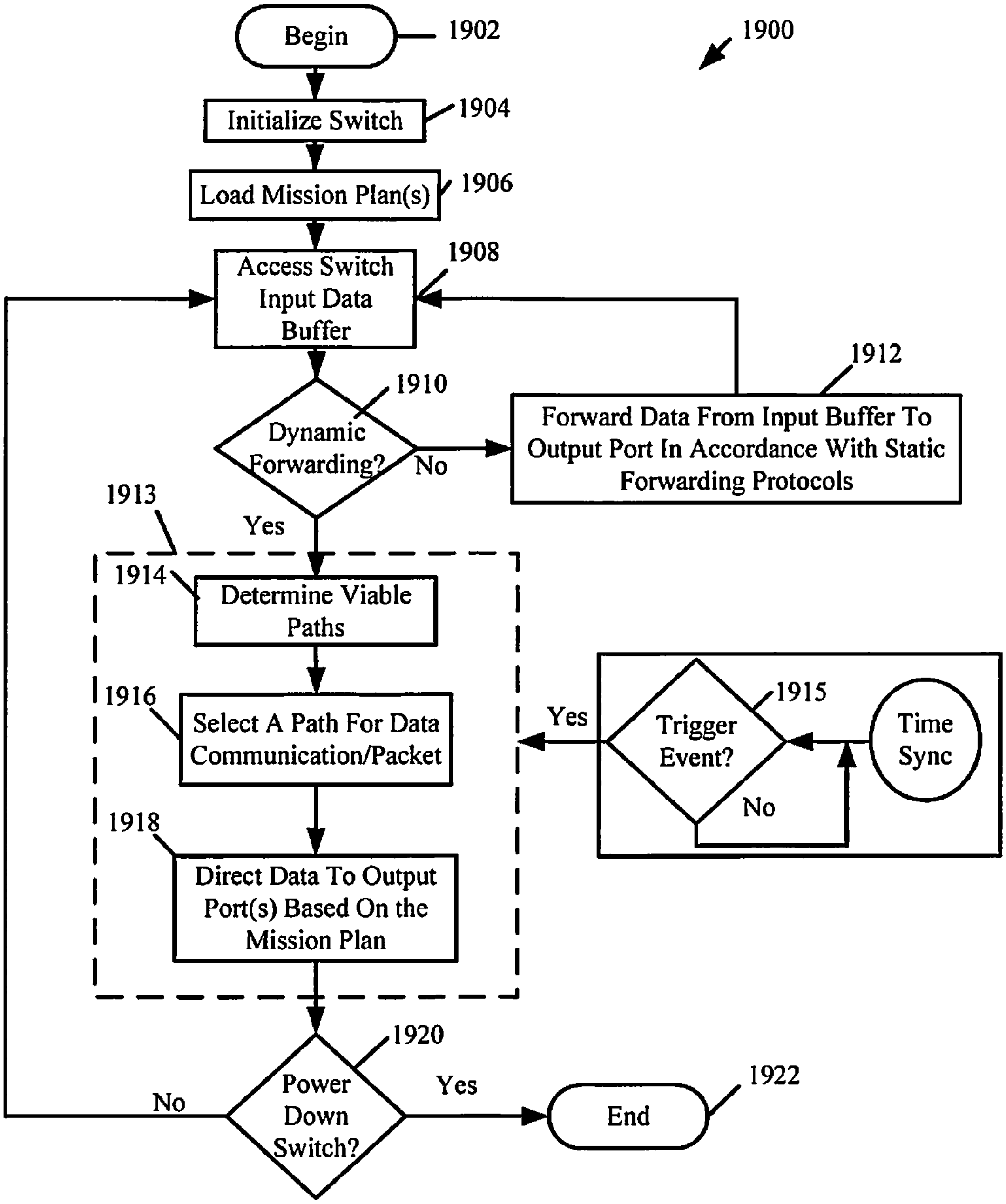
FIG. 19 is a flowchart that is useful for understanding the operation of a switch in FIG. 1.

Notably, the dynamic routing process described above can also occur independently of one or more of the MTT functions described in relation to FIG. 18. Referring now to FIG. 19, there is provided a flowchart which summarizes the operation of a switch according to one embodiment where the forwarding protocol used by the router varies in accordance with a mission plan. The process 1900 begins at step 1902 when the switch is powered up and continues to step 1904 where switch application software is initialized for executing the methods described herein. In step 1906, one or more mission plans are loaded from a memory location within the switch. At this point, the switch is ready to begin processing data and proceeds to do so at step 1908, where it accesses a received data packet from an input data buffer of the switch. In step 1910, a determination is made as to whether the switch is operating in a dynamic forwarding mode. If not, the process proceeds to step 1912 and data is forwarded to the default port associated with the next hop in the path to the destination host. Alternatively, if the switch is operating in accordance with a dynamic forwarding mode [1910:YES], the process continues on to steps 1914-1918 included within box 1913.

In step 1914, the switch determines a set of viable paths through the network the data packet may take in order to reach its destination node. These paths can be determined based on the mission plan. For example, the mission plan can be aware of a number of paths a data packet can take through the network to go from one point to the other. The switch can determine which of these paths are available according to the currently active mission plan. In step 1916, a single path is selected to send the packet based on a pseudorandom selection process which is defined by a mission plan. A check for the occurrence of a reactive trigger event also occurs in step 1915. As discussed above in relation to FIG. 18, the reactive trigger event determined in step 1915 will trigger an immediate re-determination of the current MTT status (e.g., current status of false IDP values) at that time. Once the path is selected, the data packet is directed to an output port at step 1918 toward an adjacent node specified as the next destination for the packet. In certain embodiments, the mission plan can direct the switch to generate additional noise in the network. In these embodiments, step 1918 also includes sending the packet to one or more additional ports in an effort to flood the network with extraneous packets and mask the behavior of the network.

In step 1920, a determination is made as to whether the switch has been commanded to power down. If so, the process ends at step 1922; otherwise, the process returns to 1908. In step 1908, the process continues and the next data packet is accessed from the router's input data buffer.

Figure 20:
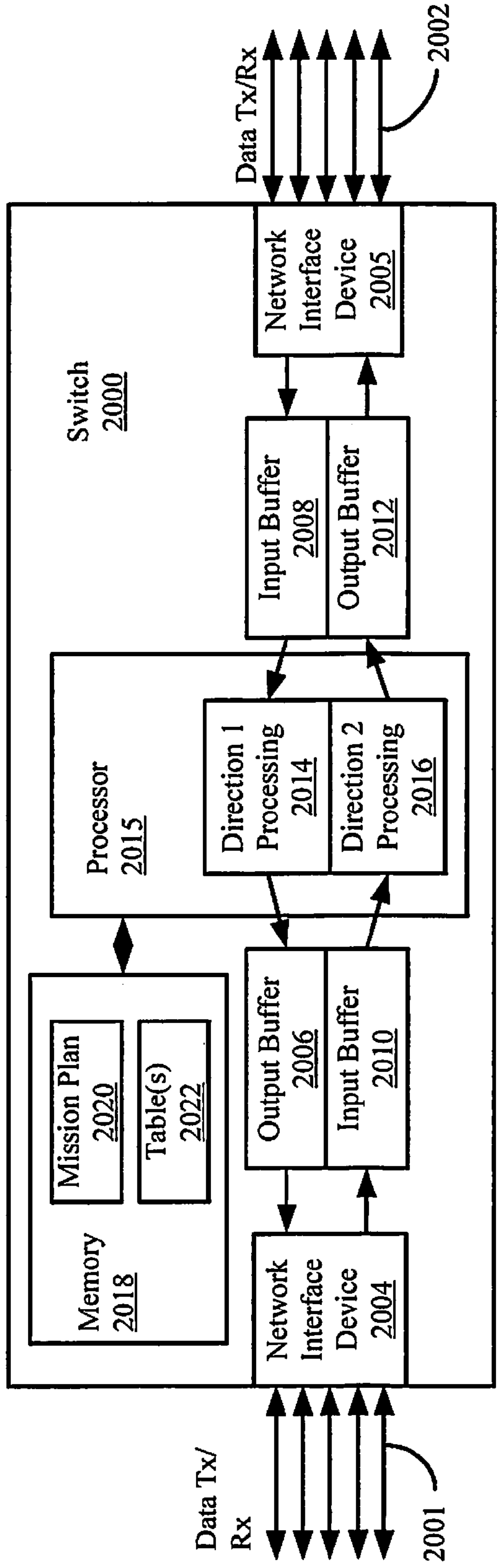
FIG. 20 is an example of a switch that can be used to implement methods for routing data packets in accordance with the present invention.

Referring now to FIG. 20, a block diagram of switch 2000 is shown. The switch 2000 has at least two data ports 2001, 2002. Each of the data ports 2001, 2002 can correspond to a respective network interface device 2004, 2005. As shown in FIG. 20, switch 2000 can have a plurality of data ports, each connecting to a different network and/or computing device. Data received at any of ports 2001 is processed at network interface device 2004 and temporarily stored at an input buffer 2010. The processor 2015 accesses the input data packets contained in input buffer 2010 and performs any necessary routing procedures as described herein (i.e., direction 2 processing 2016). The modified data packets are passed to output buffer 2012 and subsequently transmitted from port 2002 using network interface device 2005. Similarly, data received at port 2002 is processed at network interface device 2005 and temporarily stored at an input buffer 2008. The processor 2015 accesses the input data packets contained in input buffer 2008 and performs any necessary routing procedures as described herein (i.e., direction 1 processing 2014). The modified data packets are passed to output buffer 2006 and subsequently transmitted from port 2001 using network interface device 2004. In each module, dynamic routing of data packets are performed by processor 2015 in accordance with a mission plan 2020 and/or one or more tables 2022 stored in a memory 2018.

Aside from its routing functions (and the need to potentially manage dynamic routing protocols), the operation of the switch 2000 is similar in many respects to that of the modules 105-107, 113, 114. Still, it should be appreciated that the operations of the switch 2000 is also different in some ways. For example, unlike the modules, the switch will never be entirely inactive since it is always needed to at least perform conventional forwarding functions when the network is active. Still, some of the operations of the switch can be transitioned between an active mode and an inactive mode in a way that is similar to the modules. For example, the transformative function performed by the switch, involving dynamic modification of IDPs (step 1824 of FIG. 18), can be transitioned between an active mode and an inactive (bypass) mode. When in the active mode, the dynamic modification of IDPs can be performed by the switch. When in the inactive or bypass mode, IDPs are not dynamically modified, although forwarding functions are still active. Notably, a mission plan can use switches (in a manner similar to that described above with respect to the modules) to vary the location where IDP manipulations are performed. Such actions can be performed exclusively by one or more switches and/or routers as shown in FIG. 17, or can be performed in conjunction with other devices, such as modules, bridges, and firewalls. The mission plan used by the switch can be updated in a way that is similar to that described herein with respect to the modules, except that conventional forwarding functions with a static ARP table can remain enabled during times when a new mission plan is being loaded. Alternatively, as described above, the loading and activation of a new mission plan can cause a trigger event to occur whereby all data received in the input buffer after the trigger event will be processed using the updated mission plan.

The selection of IDPs to be manipulated by a switch, and the way that they are manipulated can be similar to the approach described above with respect to the modules. For example, the selection of IDPs and the selection of false IDP values can be determined by a pseudorandom or chaotic process. The process and/or the seed values for such process are respectively determined by the mission plan associated with the network. The switch 2000 will make changes to the IDP values and/or the selection of IDPs to be manipulated in accordance with the occurrence of one or more trigger events as described above with reference to the modules. These trigger events can be generated as a function of time, can be determined by the occurrence of events or both. Examples of the events referred to herein can include a user command, a timing interval, and a detection of a potential network security threat, as discussed above.

Types of IDPs that can be Varied

Referring now to FIG. 21, there is provided a list of some of the IDPs that can be manipulated by the modules 105-107, 113, 114 and/or by bridge 115. Each of the parameters listed in FIG. 21 is included in a data communication included in a network using a TCP/IP communication protocol. Most of the information types listed in FIG. 21 are well known to those skilled in the art. However, a brief description of each type of information and its use as an IDP is provided herein. Also provided is a brief discussion of the ways in which each IDP can be manipulated.

IP Address. An IP Address is a numerical identifier assigned to each computing device participating in a computer network where the network uses the well known Internet Protocol for communication. The IP address can be a thirty two bit or one hundred twenty eight bit number. For purposes of the present invention, the IP address number can be changed to a false value that is selected randomly (e.g., using a pseudorandom number generator). Alternatively, the false IP address value can be randomly selected from a predetermined list of false values (e.g., a list specified by a mission plan). The source and destination IP addresses are included in header portion of a data packet. Accordingly, manipulation of these values is performed by simply changing by using packet manipulation techniques which change the IP header information. When the packet arrives at a second module (the location of which can be manipulated), the false IP address values are transformed back to their true values. The second module uses the same pseudorandom process (or its inverse) to derive the true IP address value based on the false value.

MAC Address. A MAC address is a unique value assigned to a network interface device by a manufacturer and stored in an onboard ROM. For purposes of the present invention, the source and/or destination MAC address can be changed to a false value that is selected randomly (e.g., using a pseudorandom number generator). Alternatively, the false MAC value can be randomly selected from a predetermined list of false values (e.g., a list specified by a mission plan). The source and destination MAC addresses are included in header portion of data packet. Accordingly, manipulation of these values is performed by simply changing an Ethernet header information of each packet. When the packet arrives at a second module (the location of which can be manipulated), the false MAC address values are transformed back to their true values. A module receiving a packet will use the same pseudorandom process (or its inverse) to derive the true MAC address value based on the false value.

Network/Subnet. In some embodiments, the IP address can be thought of as a single IDP. However, an IP address is generally defined as including at least two parts which include a network prefix portion and a host number portion. The network prefix portion identifies a network to which a data packet is to be communicated. The host number identifies the particular node within a Local Area Network ("LAN"). A sub-network (sometimes referred to as a subnet) is a logical portion of an IP network. Where a network is divided into two or more sub-networks, a portion of the host number section of the IP address is used to specify a subnet number. For purposes of the present invention, the network prefix, the subnet number and the host number can each be considered to be a separate IDP. Accordingly, each of these IDPs can be separately manipulated independently of the others in a pseudorandom way. Moreover, it will be appreciated that a data packet will include a source IP address and a destination IP address. Accordingly, the network prefix, the subnet number and host number can be manipulated in the source IP address and/or the destination IP address, for a total of six different variable IDPs that can be manipulated in a pseudorandom way. A module receiving a packet will use the same pseudorandom process as an originating node (or the inverse of such process) to derive the true Network/subnet information value based on the false value.

TCP Sequence. Two client computers communicating with each other on opposite sides of a TCP session will each maintain a TCP sequence number. The sequence number allows each computer to track how much data it has communicated. The TCP sequence number is included in the TCP header portion of each packet which is communicated during the session. At the initiation of a TCP session, the initial sequence number value is randomly selected. For purposes of the present invention, the TCP sequence number can be manipulated as an IDP in accordance with a pseudorandom process. For example, the TCP sequence number can be changed to a false value that is selected randomly (e.g., using a pseudorandom number generator). When the packet is received at a different module of the network (the location of which will be dynamically varied), the TCP sequence number can be transformed from a false value back to a true value, using an inverse of the pseudorandom process.

Port Number. A TCP/IP port number is included in the TCP or UDP header portion of a data packet. Ports as used in the TCP/IP communication protocol are well known in the art and therefore will not be described herein in detail. The port information is contained within the TCP header portion of the data packet. Accordingly, manipulation of the port information is accomplished by simply modifying the TCP header information to change a true port value to a false port value. As with the other IDPs discussed here, the port number information can be manipulated or transformed to a false value in accordance with a pseudorandom process at a first module. The port information can later be transformed from a false value to a true value at a second module, using an inverse of the pseudorandom process.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for enterprise mission management of a computer network in which node operations are dynamically configurable, the method comprising: configuring said computer network to behave in accordance with at least one first mission plan of a plurality of mission plans, said first mission plan specifying a manner in which an assigned value for at least one first identity parameter of a plurality of identity parameters contained in a data packet is to be dynamically modified by at least one first node of said computer network based on a first selected function, where the plurality of identity parameters uniquely identify hardware and software of at least one node of the plurality of nodes in said computer network; detecting a first trigger event within said computer network which indicates that a new mission plan needs to be implemented within said computer network; obtaining a second mission plan of the plurality of mission plans in response to said trigger event, the second mission plan different from the first mission plan and specifying a manner in which an assigned value for at least one second identity parameter of the plurality of identity parameters is to be dynamically modified by at least one second node of the computer network based on a second selected function; determining if any conflicts exist between operations of the second node defined by the second mission plan and operations of the first node defined by the first mission plan; and configuring operations of said computer network to further behave in accordance with said second mission plan such that said manner as specified by the second mission plan is different than said manner specified by the first mission plan, if it is determined that no conflict exists between operations of the first and second nodes as defined by the first and second mission plans; wherein said manner is further defined in accordance with at least a selection of said at least one identity parameter comprising an IP address, a MAC address, a network/subnet, a TCP sequence or a port number from among said plurality of identity parameters.

2. The method according to claim 1, wherein the first trigger event is detected based on at least one of content of a packet being communicated within the computer network, a congestion level of the computer network, a state of the computer network, user activities within the computer network, and malicious attacks to the computer network.

3. The method according to claim 1, wherein the second mission plan is obtained by selecting a mission plan from a plurality of pre-stored mission plans based on at least one of requirements of a new mission and results from analyzing operational aspects of the computer network.

4. The method according to claim 1, wherein the second mission plan is obtained by selecting a mission plan from a plurality of pre-stored mission plans based on at least one of requirements of a new mission and results from analyzing operational aspects of the computer network.

5. The method according to claim 1, wherein the second mission plan is obtained by dynamically generating a mission plan based on at least one of a concept of operations for a mission, an architecture of the computer network, relationships between resources of the computer network, and effectiveness ratings associated with a plurality of identity parameters.

6. The method according to claim 1, further comprising modifying the second mission plan to obtain a third mission plan if a conflict is determined to exist between operations of the first and second nodes as defined by the first and second mission plans.

7. The method according to claim 2, further comprising determining if any conflicts exist between operations of a third node defined by the third mission plan and operations of the first node defined by the first mission plan.

8. The method according to claim 7, further comprising configuring operations of said computer network to operate in accordance with said third mission plan if it is determined that no conflict exists between operations of the first and third nodes as defined by the first and third mission plans.

9. The method according to claim 1, further comprising:

determining whether the computer network should continue to behave in accordance with the first or second mission plan; and re-configuring the computer network such that the computer network no longer behaves in accordance with the first or second mission plan, if it is determined that the computer network should not continue to operate in accordance with the first or second mission plan.

10. The method according to claim 1, further comprising: determining whether the computer network should continue to behave in accordance with the first or second mission plan; and re-configuring the computer network to behave in accordance with a third mission plan instead of the first or second mission plan, if it is determined that the computer network should not continue to operate in accordance with the first or second mission plan.

11. The method according to claim 1, further comprising reconfiguring operations of the computer network such that a location where at least one of the first and second identity parameters are being modified is changed based on a distance vector.

12. The method according to claim 1, wherein the distance vector has a variable value which changes in accordance with an overall network behavior specified a mission plan.

13. A system, comprising: one or more processors operating to:

configure a computer network to behave in accordance with at least one first mission plan of a plurality of mission plans, said first mission plan specifying a manner in which an assigned value for at least one first identity parameter of a plurality of identity parameters contained in a data packet is to be dynamically modified by at least one first node of said computer network based on a first selected function, where the plurality of identity parameters uniquely identify hardware and software of at least one node of the plurality of nodes in said computer network; detect a first trigger event within said computer network which indicates that a new mission plan needs to be implemented within said computer network; obtain a second mission plan of the plurality of mission plans in response to said trigger event, the second mission plan different from the first mission plan and specifying a manner in which an assigned value for at least one second identity parameter of the plurality of identity parameters is to be dynamically modified by at least one second node of the computer network based on a second selected function; determine if any conflicts exist between operations of the second node defined by the second mission plan and operations of the first node defined by the first mission plan; and configure operations of said computer network to further behave in accordance with said second mission plan such that said manner as specified by the second mission plan is different than said manner specified by the first mission plan, if it is determined that no conflict exists between operations of the first and second nodes as defined by the first and second mission plans; wherein said manner is further defined in accordance with at least one selection of said at least one identity parameter comprising an IP address, a MAC address, a network/subnet, a TCP sequence or a port number from among said plurality of identity parameters.

14. The system according to claim 13, wherein the first trigger event is detected based on at least one of content of a packet being communicated within the computer network, a congestion level of the computer network, a state of the computer network, user activities within the computer network, and malicious attacks to the computer network.

15. The system according to claim 13, wherein the second mission plan is obtained by selecting a mission plan from a plurality of pre-stored mission plans based on at least one of requirements of a new mission and results from analyzing operational aspects of the computer network.

16. The system according to claim 13, wherein the second mission plan is obtained by automatically generating a mission plan based on at least one of requirements of a new mission and results from analyzing operational aspects of the computer network.

17. The system according to claim 13, wherein the second mission plan is obtained by dynamically generating a mission plan based on at least one of a concept of operations for a mission, an architecture of the computer network, relationships between resources of the computer network, and effectiveness ratings associated with a plurality of identity parameters.

18. The system according to claim 13, wherein the one or more processors are further operative to modify the second mission plan to obtain a third mission plan if a conflict is determined to exist between operations of the first and second nodes as defined by the first and second mission plans.

19. The system according to claim 18, wherein the one or more processors are further operative to determine if any conflicts exist between operations of a third node defined by the third mission plan and operations of the first node defined by the first mission plan.

20. The system according to claim 19, wherein the one or more processors are further operative to configure operations of said computer network to operate in accordance with said third mission plan if it is determined that no conflict exists between operations of the first and third nodes as defined by the first and third mission plans.

21. The system according to claim 13, wherein the one or more processors are further operative to: determine whether the computer network should continue to behave in accordance with the first or second mission plan; and re-configure the computer network such that the computer network no longer behaves in accordance with the first or second mission plan, if it is determined that the computer network should not continue to operate in accordance with the first or second mission plan.

22. The system according to claim 13, wherein the one or more processors are further operative to: determine whether the computer network should continue to behave in accordance with the first or second mission plan; and re-configure the computer network to behave in accordance with a third mission plan instead of the first or second mission plan, if it is determined that the computer network should not continue to operate in accordance with the first or second mission plan.

* * * * *